(12) United States Patent
Filipovich

(10) Patent No.: US 12,299,731 B2
(45) Date of Patent: May 13, 2025

(54) METHOD AND APPARATUS FOR LOAD BALANCING MANUFACTURING EXECUTION AMONG OPTICAL LABORATORIES

(71) Applicant: ESSILOR INTERNATIONAL, Charenton-le-pont (FR)

(72) Inventor: Michael A. Filipovich, Dallas, TX (US)

(73) Assignee: Essilor International, Charenton-le-Pont (FR)

(*) Notice: Subject to any disclaimer, the term of this patent is extended or adjusted under 35 U.S.C. 154(b) by 490 days.

(21) Appl. No.: 17/764,849

(22) PCT Filed: Sep. 29, 2020

(86) PCT No.: PCT/EP2020/077268
§ 371 (c)(1),
(2) Date: Mar. 29, 2022

(87) PCT Pub. No.: WO2021/063969
PCT Pub. Date: Apr. 8, 2021

(65) Prior Publication Data
US 2022/0343399 A1 Oct. 27, 2022

(30) Foreign Application Priority Data
Oct. 1, 2019 (EP) .................................... 19306250

(51) Int. Cl.
*G06Q 30/00* (2023.01)
*G06Q 30/0601* (2023.01)
(52) U.S. Cl.
CPC ................. *G06Q 30/0635* (2013.01)
(58) Field of Classification Search
CPC ................. G06Q 30/0635
See application file for complete search history.

(56) References Cited

U.S. PATENT DOCUMENTS

| | | | | |
|---|---|---|---|---|
| 9,959,563 B1* | 5/2018 | Wu | ............... | G06Q 30/0631 |
| 2004/0215525 A1* | 10/2004 | Keane | ............... | G06Q 30/06 |
| | | | | 705/26.81 |

(Continued)

FOREIGN PATENT DOCUMENTS

| CN | 107924499 A | 4/2018 |
|---|---|---|
| CN | 108369716 A | 8/2018 |

OTHER PUBLICATIONS

Ittimethakul, Montira. "Warehouse performance improvement through optimal order picking location: a case of an optical lens company." (2011).*

(Continued)

*Primary Examiner* — Kathleen Palavecino
(74) *Attorney, Agent, or Firm* — NIXON & VANDERHYE

(57) ABSTRACT

A method and apparatus are provided for optical manufacturing laboratories (OMLs) obtaining a plurality of performance indictors (PIs). The PIs are published or otherwise distributed among one or more participants (e.g., one or more ECPs and/or an administrative team of the OMLs). Logic blocks are generated for respective manufacturing orders to express priorities of the requirements/preferences of the respective orders. A combination of the logic blocks together with the plurality of PIs are applied as inputs to the selection rules (e.g., routing logic), which then output rankings of the OMLs in accordance with the priorities of the respective orders. The orders are then routed to an optimal combination of the OMLs based on the results from the selection rules.

15 Claims, 11 Drawing Sheets

(56) References Cited

U.S. PATENT DOCUMENTS

| | | | |
|---|---|---|---|
| 2014/0302749 A1* | 10/2014 | Samukawa | ............. B24B 9/148 |
| | | | 318/568.1 |
| 2016/0011437 A1* | 1/2016 | Nishimura | ........... A61B 3/0091 |
| | | | 351/204 |
| 2018/0204111 A1 | 7/2018 | Zadeh et al. | |
| 2018/0240068 A1 | 8/2018 | Filipovich | |
| 2018/0276589 A1 | 9/2018 | Filipovich | |
| 2018/0364498 A1 | 12/2018 | Piraube | |

OTHER PUBLICATIONS

Office Action issued in European Patent Application No. 19 306 250.2 dated Jul. 28, 2022.
International Search Report and Written Opinion of the International Searching Authority dated Oct. 30, 2020, in connection with corresponding international Application No. PCT/EP2020/077268 (12 pp.).
Office Action, issued in Chinese Patent Application No. 202080069257.6 dated Dec. 25, 2024.

* cited by examiner

METHOD AND APPARATUS FOR LOAD BALANCING MANUFACTURING EXECUTION AMONG OPTICAL LABORATORIES

This application is the U.S. national phase of International Application No. PCT/EP2020/077268 filed Sep. 29, 2020 which designated the U.S. and claims priority to EP 19306250.2 filed Oct. 1, 2019, the entire contents of each of which are hereby incorporated by reference.

FIELD

This disclosure relates to a manufacturing process to load balance manufacturing tasks among manufacturing resources, and, more particularly, to routing manufacturing orders to respective manufacturing laboratories based on a combination of performance indicators (PIs) and logic blocks, where the PIs are published by the laboratories and the logic blocks express priorities among order preferences/requirements (e.g., if the PIs include a quality rating and a manufacturing time, the first priority might be a requirement that the quality rating is greater than four stars and the second priority might be a preference that manufacturing time is less than three days).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In manufacturing eye-care products (e.g., prescription eyeglasses), either a hub-and-spoke (HS) model or a peer-to-peer (P2P) model can be used to route orders from local Eye Care Practitioners (ECPs) to optical manufacturing laboratories (OMLs). In these two models of order routing, there are times when it is beneficial for optical prescription (Rx) orders to be routed or rerouted from one optical manufacturing laboratory to another. There are several reasons why it may be beneficial to reroute Rx orders, e.g., a first OML might experience unexpected delays (e.g., due to equipment failure or unscheduled maintenance) requiring previously received orders to be rerouted to other OMLs in order to be timely completed. However, the OMLs can lack sufficient information and/or automated routing processes to efficiently distribute the Rx orders to other OMLs.

Both P2P and HS models can be used to route thousands of optical Rx orders across networks of OMLs. However, optical Rx orders are complex and often require complex multi-step manufacturing processes to complete. Optical Rx orders are also often unique because they represent an individual's specific prescription, choice of lens material, choice of lens design, choice of lens coating, and/or choice of frame.

Accordingly, to deal with this complexity, complex manufacturing processes have been developed. Often, however, the manufacturing process capabilities required for a given Rx order are only available in a limited number of optical labs or processing centers. Thus, a routing system may have capabilities to determine the destination of an order based on technical aspects of the order, such as lens material, lens coating, Rx powers, frame choice and the expected capabilities of a processing center to which the order might be routed.

Existing systems for automated routing of orders rely on large and complicated sets of rules to combine various aspects of the orders with potential destination sites that can accomplish the necessary processing tasks. However, these existing systems are not ideal. The large and complicated sets of rules tend to be administratively onerous and are typically hardwired, making them unresponsive to changes. These challenges with systems based on large and complicated sets of rules result in inefficient load balancing. Thus, improved systems to perform routing logic are desired.

SUMMARY

According to aspects of one embodiment, there is provided a method of optical manufacturing, that includes (i) publishing, by optical manufacturing laboratories (OMLs), a plurality of performance indictors (PIs), the PIs being published to one or more participants selected from an eye care practitioner (ECP) of one or more ECPs and an administrative team of the OMLs. Further, the method of optical manufacturing includes (ii) generating, by processing circuitry of the one or more participants, logic blocks that express priorities for respective manufacturing orders; and (iii) applying, by the processing circuitry, the logic blocks and the plurality of PIs as inputs to selection rules, the selection rules ranking the OMLs in accordance with the priorities for the respective manufacturing orders. The method of optical manufacturing then proceeds by (iv) routing, by a communication interface of the one or more participants, the manufacturing orders to an optimal combination of the OMLs determined by the processing circuitry in accordance with the selection rules.

According to aspects of another embodiment, there is provided an eye care practitioner (ECP) apparatus, that includes (i) a communication interface configured to (a) receive a plurality of performance indictors (PIs) published by optical manufacturing laboratories (OMLs), the respective plurality of PIs corresponding to each OML representing manufacturing capabilities and/or capacity of the each OML, and (b) send manufacturing orders to selected OMLs. Further, the ECP apparatus includes (ii) processing circuitry configured to (a) generate logic blocks that represent priorities (preferences) and requirements for respective manufacturing orders, (b) apply the logic blocks to an objective (utility) function that ranks the OMLs based on the priorities for the respective manufacturing orders, and (c) select an optimal combination of the OMLs to which to send the respective manufacturing orders, the optimal combination of the OMLs being selected based on selection rules to satisfy the priorities and requirements of the logic blocks.

According to aspects of a third embodiment, there is provided a non-transitory program storage device that is readable by a computer, tangibly embodying a program of instructions executable by the computer. The program when executed by the computer causes the performance of a method that includes (i) publishing, by optical manufacturing laboratories (OMLs), a plurality of performance indictors (PIs), the PIs being published to one or more participants selected from an eye care practitioner (ECP) of one or more ECPs and an administrative team of the OMLs. Further, the method includes (ii) generating, by processing circuitry of the ECP, logic blocks that express priorities for respective manufacturing orders; and (iii) applying, by the processing circuitry, the logic blocks and the plurality of PIs as inputs to selection rules, the selection rules ranking the OMLs in accordance with the priorities for the respective manufacturing orders. The method then proceeds by (iv) routing, by a communication interface of the ECP, the manufacturing orders to an optimal combination of the OMLs determined by the processing circuitry in accordance with the selection rules.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1A:
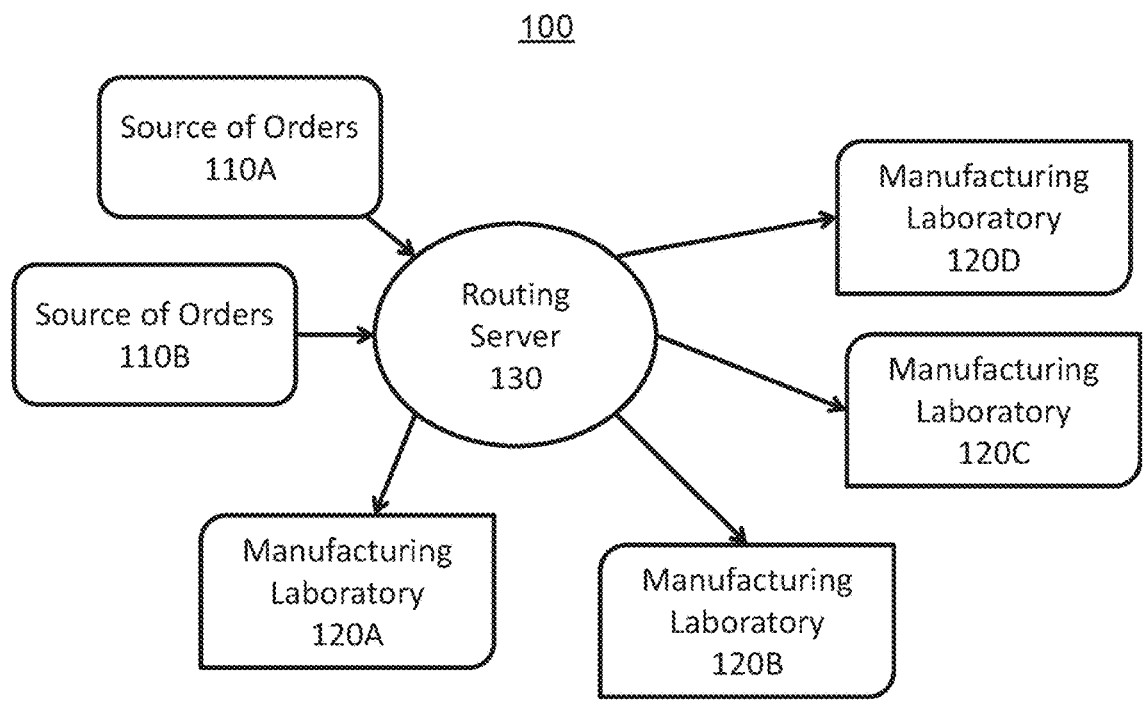
FIG. 1A shows a non-limiting schematic diagram of a hub-and-spoke (HS) model for the routing of manufacturing orders, according to certain implementations.

As discussed above, automated routing systems with complicated and large sets of rules can be used to select optical manufacturing laboratories (OMLs) that satisfy the minimum requirements for a given set of prescription (Rx) orders. Nevertheless, these automated routing systems are not necessarily efficient or optimal. That is, these automated routing systems can select potential destination OMLs that are sufficient to accomplish the necessary processing tasks for the given set of Rx orders. However, merely being sufficient to accomplish the necessary processing tasks does not ensure that cost and quality are being optimized, and does not ensure optimal load balancing among the available OMLs to improve the overall efficiency. The methods and apparatus described herein provide improved performance to better automate control in routing Rx orders.

For example, one challenge is that rules for routing orders are based on the number of orders sent from a given server without a priori knowledge of the numbers of orders in process at the destination laboratory. In a hub-and-spoke (HS) model, the OMLs receive all their orders from a central hub/server, and the central server can effectively control capacity by counting how many orders have been sent during the day, and use this information to estimate a backlog (i.e., remaining capacity) at each of the destination OMLs. In a peer-to-peer (P2P) model, however, one peer typically lacks information regarding how many orders were sent from other peers to a given OML on a given day. Thus, the Rx orders might be sent to an OML with a significant backlog while another OML sits idle waiting for Rx orders or the other OML has a smaller backlog and therefore can turnaround Rx orders more quickly.

Even though the HS model might be better than the P2P model at estimating the backlog at the destination OMLs, neither model really knows how many orders are already in process at a given OML from previous days (e.g., in previous equipment breakdowns might have delayed the processing of previous orders). That is, events happen from time to time such as equipment break downs, power outages, or severe weather that prevents personnel from reaching the lab. Expected capacity/throughput at a given lab or for a given process within that lab can be compromised at any time and for an indeterminate amount of time. Thus, under current automated systems of routing, it is not uncommon for a given OML or group of OMLs to undergo periods during which they are overwhelmed with work (or overwhelmed with Rx orders requiring a specific type of processing).

The methods and apparatuses described herein address the above challenges, e.g., through a system in which optical manufacturing laboratories (OMLs) publish performance indictors (PIs) to either an administrative or executive team of the OMLs or to the respective eye care practitioner (ECPs). These PIs can be, e.g., from (i) overall process time, (ii) production capacity, (iii) manufacturing capabilities, (iv) cost, (v) inventories, and/or (vi) quality indicators, as discussed below. Using the PIs, the ECP can then perform routing logic based on logic blocks that express priorities for respective manufacturing orders. For example, this routing logic can include applying the logic blocks and the plurality of PIs as inputs to selection rules, and the selection rules output a rank ordering of the OMLs in accordance with the priorities for the respective manufacturing orders. In certain implementations, the logic blocks can express priorities regarding two or more elements selected from (i) time to complete manufacturing, (ii) manufacturing cost, (iii) quality rating, (iv) surfacing manufacturing capabilities, (v) edging manufacturing capabilities, (vi) coating manufacturing capabilities, (vii) inventory availability of the components necessary for manufacture of the order, and (viii) shipping cost/distance/time. Then, the manufacturing orders can be routed to a combination of the OMLs that has been optimized according to the selection rules.

Referring now to the drawings, wherein like reference numerals designate identical or corresponding parts throughout the several views, FIG. 1A shows a non-limiting example of a hub-and-spoke (HS) system 100 for routing Rx orders from sources of orders 110A and 110B through a routing server 130 to respective manufacturing laboratories 120A, 120B, 120C, and 120D. This is an example of a centralized routing system. The sources of orders 110A and 110B can also be referred to as Eye Care Practitioners (ECPs), and the manufacturing laboratories 120A, 120B, 120C, and 120D can also be referred to as optical manufacturing laboratories (OMLs).

In the HS model for routing Rx orders (or more generally any manufacturing order of an eye-care good), one or more sources of the orders will send the orders to a centralized routing server (i.e., the hub). Then, the hub will distribute the orders among a set of processing laboratories (i.e., the OMLs).

Figure 1B:
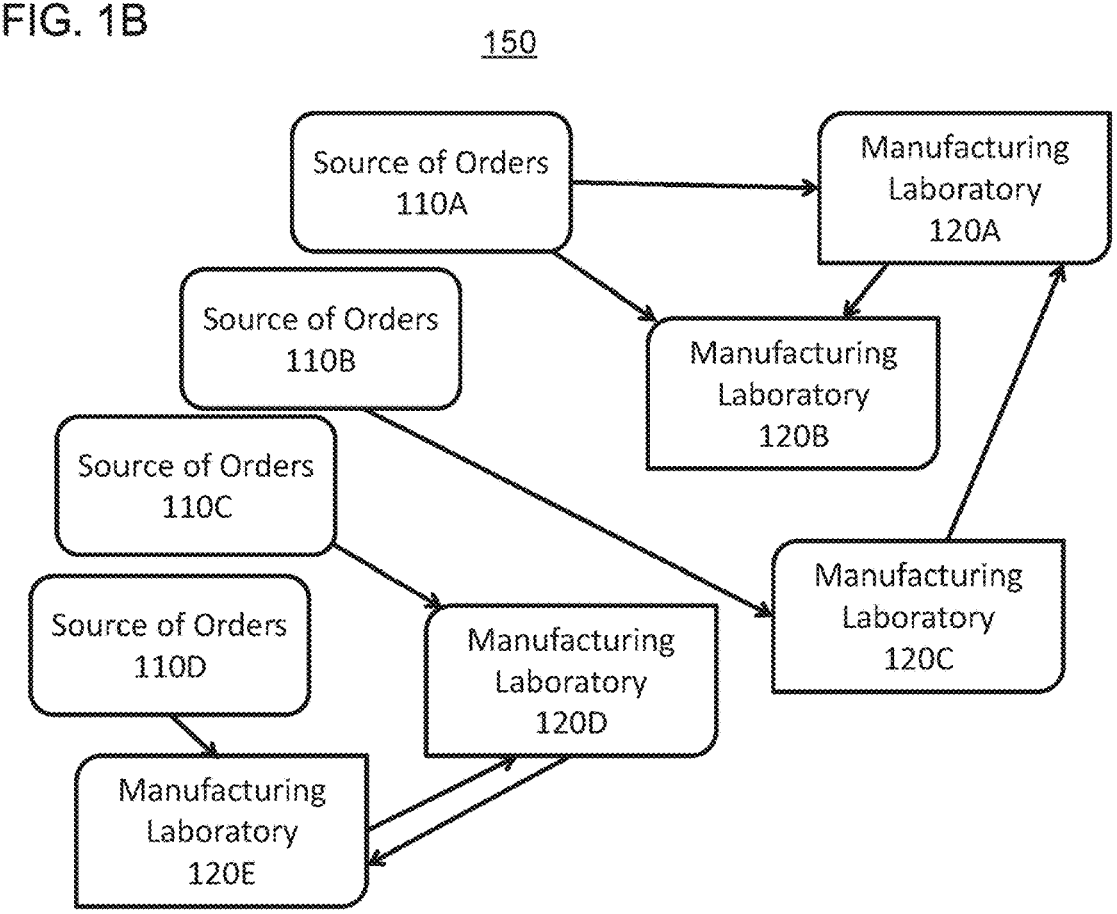
FIG. 1B shows a non-limiting schematic diagram of a peer-to-peer (P2P) model for the routing of manufacturing orders, according to certain implementations.

FIG. 1B shows a non-limiting example of a peer-to-peer (P2P) system 150 in which Rx orders are routed directly from sources of orders 110A, 110B, 110C, and 110D to respective manufacturing laboratories 120A, 120B, 120C, 120D, and 120E. Additionally, the manufacturing laboratories can reroute Rx orders amongst themselves, as shown with manufacturing laboratories 120D and 120E routing Rx orders to each other. This is an example of a distributed routing system.

In the P2P model of routing, multiple order sources (typically ECPs) will send orders to respective OMLs. For example, an ECP might send all of their orders to one or more preferred processing laboratories. The OMLs can then reroute the orders among themselves for processing all or part of the order on behalf of the laboratory that originally received the order.

Rx orders can be routed from one OML to another for various reasons, including: (i) a first OML has capabilities that a second OML does not (e.g. a specialized coating machine or process), resulting in the second OML routing Rx orders requiring the specialized coating machine to the first OML; (ii) a first OML has more capacity than a second OML, resulting in the first OML routing Rx orders to the second OML until their relative loads are balanced; (iii) a first OML can process the orders more cost effectively than a second OML; and (iv) a first OML can process orders in a more timely manner (e.g., the first OML processes orders during weekends, whereas a second OML is only operational Monday through Friday).

Either the HS model or the P2P model can be used to manage the routing of Rx orders. Some businesses can manage an HS model for routing orders, as shown in FIG. 1A. For example, a large retailer might send all of its orders into one central server which in turn routes orders from that central server to any of several production labs for processing. Alternatively, other businesses can manage a P2P model for routing orders, as shown in FIG. 1B. For example, local Eye Care Practitioners (ECPs) might receive orders and route the orders to laboratories in a region.

Both P2P and HS models can be used for routing thousands of Rx orders. Optical Rx orders are complex and often require complex multi-step manufacturing processes to complete. Optical Rx orders are also often unique because they represent an individual's specific prescription, choice of lens material, choice of lens design, choice of lens coating, and choice of frame. This complexity demands complex manufacturing processes and often the manufacturing process capabilities required for a given Rx order are only available in a limited number of optical labs or processing centers. Thus, a routing system would ideally have capabilities to designate the destination of an order based on technical aspects of the order such as lens material, lens coating, Rx powers, frame choice and the expected capabilities of a processing center to which the order might be routed.

Given the complexity of the manufacturing processes and the uniqueness of optical Rx orders, automated routing systems tend to be burdened with huge, complicated sets of rules to combine various aspects of the orders with potential destination sites that can accomplish the necessary processing tasks. Although effective for managing the number of orders of a given type that are sent to a given site on a given day, previous systems with huge, complicated sets of rules are not necessarily efficient, easily administrable, robust, or optimal. To be more efficient, previous systems might require human intervention to make ad hoc adjustments in order to optimize the number of orders in total and/or of a given type at a given processing center when possible.

For example, a first laboratory 120A might be capable of producing 12,000 orders in a day, so the businesses might strive to route 10,000 orders to the first laboratory 120A on any given day to allow for some variation in the actual count that are routed the first laboratory 120A. These systems are effective, and used when possible to manage the number of orders of a given type that are sent to a given site on a given day. These configuration capabilities are used to optimize the number of orders in total and/or of a given type at a given processing center when possible. For example, a given laboratory might be capable of producing 12,000 orders in a day, so the businesses might strive to route 10,000 orders to that laboratory on any given day to allow for some variation in the actual count that are routed there.

One challenge with previous systems based on complicated sets of rules is that they lack information/feedback from the OMLs regarding how many Rx orders from previous days are still in the queue awaiting manufacture (e.g., the backlog of Rx orders). That is, the complicated sets of rules are based on the number of orders sent from a given server without a priori knowledge of the numbers of orders in process at the destination laboratory.

If that server represents a HS model and the processing centers receive all their orders from this central hub, the capacity controls are fairly effective because the central server can count how many orders have been sent during the day, but they still lack information regarding breakdowns and/or unscheduled maintenance at particular laboratories.

Even worse is the case of the P2P model, because one peer typically lacks knowledge regarding how many orders were sent from other peers to a given laboratory on a given day.

Both P2P and HS models using previous systems of routing logic, which are based on complicated sets of rules, suffer from the absence of feedback and information regarding how many orders are in process already at a given laboratory from previous days. For example, events happen from time to time such as equipment break downs, power outages, or severe weather that prevents personnel from reaching the laboratories. Expected capacity at a given lab or for a given process within that lab can be compromised at any time and for an indeterminate amount of time. Thus, on any given day, it is not uncommon for a given laboratory or group of laboratories to be overwhelmed with work (e.g., the total amount of work in general or a specific type of work requiring a specific process).

In contrast to previous systems, the methods and systems described herein enable automated load balancing among optical laboratories and businesses that process optical orders including routing hubs that route orders among optical laboratories. For example, in certain implementations, the methods and systems described herein use a process wherein the systems within the laboratories can automatically electronically share information, and then automatically use that information to optimize the numbers and types of orders that are routed from one laboratory to another to achieve optimization among costs, capacities, delivery times, technical capabilities, and availability of source materials (e.g., lens blanks, frames, components, or coatings).

Further, the methods and systems described herein can use this information to adjust and adapt to patterns and data in an automated and intelligent fashion such that the processes improve over time. In certain implementations, this is achieved using machine learning in an artificial intelligence (AI) approach where the data are used by internal analytical engines to adapt to the evolving information being shared among the laboratories. Herein, deep learning (DL) networks are used to illustrate this AI approach, but the system and methods disclosed herein are not limited to DL networks. For example, the AI approach can also be implemented using support vector machines, k-means clustering, fuzzy logic, systems of autonomous agents, and other know AI approaches.

Note that the term "laboratory" is defined herein as referring to a processing center, routing hub, call center, commercial entity, fulfillment center, or any other entity or system that touches the optical order, as would be understood by a person of ordinary skill in the art. The optical order is typically an Rx order, but can also be any other type of order that is captured and delivered through a network of laboratories that could be as few as two or as many as one hundred or more. The network of laboratories could be local, regional or global, and the laboratories can be owned by different parent companies.

As described in greater detail below, the disclosure provides systems and methods to effectively balance the load or number of orders across a network of laboratories to optimize the cost, delivery times, capacity management, throughput, quality and other aspects of the business including combinations of these aspects. The embodiments describe a process whereby the various servers communicate with each other to share information such as counts of work in process, minimum ideal counts of given work types, maximum ideal counts of given work types, counts of given work types at various stages of production, production costs, production times, yields and more.

Further, the disclosure describes how these data can be captured, grouped, shared among servers and laboratories, and eventually used by the systems to guide the order routing decisions within those systems to optimize and prioritize aspects of the process such as cost, delivery time, or quality. For example, a given order might have higher priority on fast delivery time and lower priority on cost, whereas another order might place a higher priority on cost by being more penny wise relative to delivery time, preferring that cost be a stronger determinant of the routing decision over delivery time. Accordingly, these aspects of the routing process can include preference profiles that are established for customers or patients that sent in the order for processing.

The disclosure describes how these data can be used by the servers to (i) identify patterns and rankings, (ii) aggregate the data in various ways, and (iii) analyze the data. The servers can then adapt the routing decision processes to changing conditions such as rising costs at a given processing center or deteriorating quality at another processing center, or a breakdown in the coating center at yet another processing center. Analytical processes (e.g., machine learning and artificial intelligence) can be used to adapt the routing flows based on these changing conditions and to optimize the routing decisions based on a rule-set or logical combination of factors. Accordingly, the routing system can robustly and dynamically evolve with minimal administrative oversight, in contrast to a fixed, pre-determined set of routing rules such as those used in previous systems.

The methods described herein use a process whereby routing logic is performed using logic blocks that express priorities for respective manufacturing orders. Thus, orders can be logically grouped for purposes of routing decisions and analysis, and the process can maintain the order grouping catalog and routing logic in a way that can be configured at each sending or receiving laboratory such that the descriptions and constraints of the order groups become a common language that is recognized among laboratories. That is, using the common language resulting from the use of logic blocks to express priorities and preferences/requirements, each node in the system (e.g., the ECPs, OMLs, or administrator) can make a fully informed decision regarding the optimal routing of the manufacturing orders.

Figure 2:
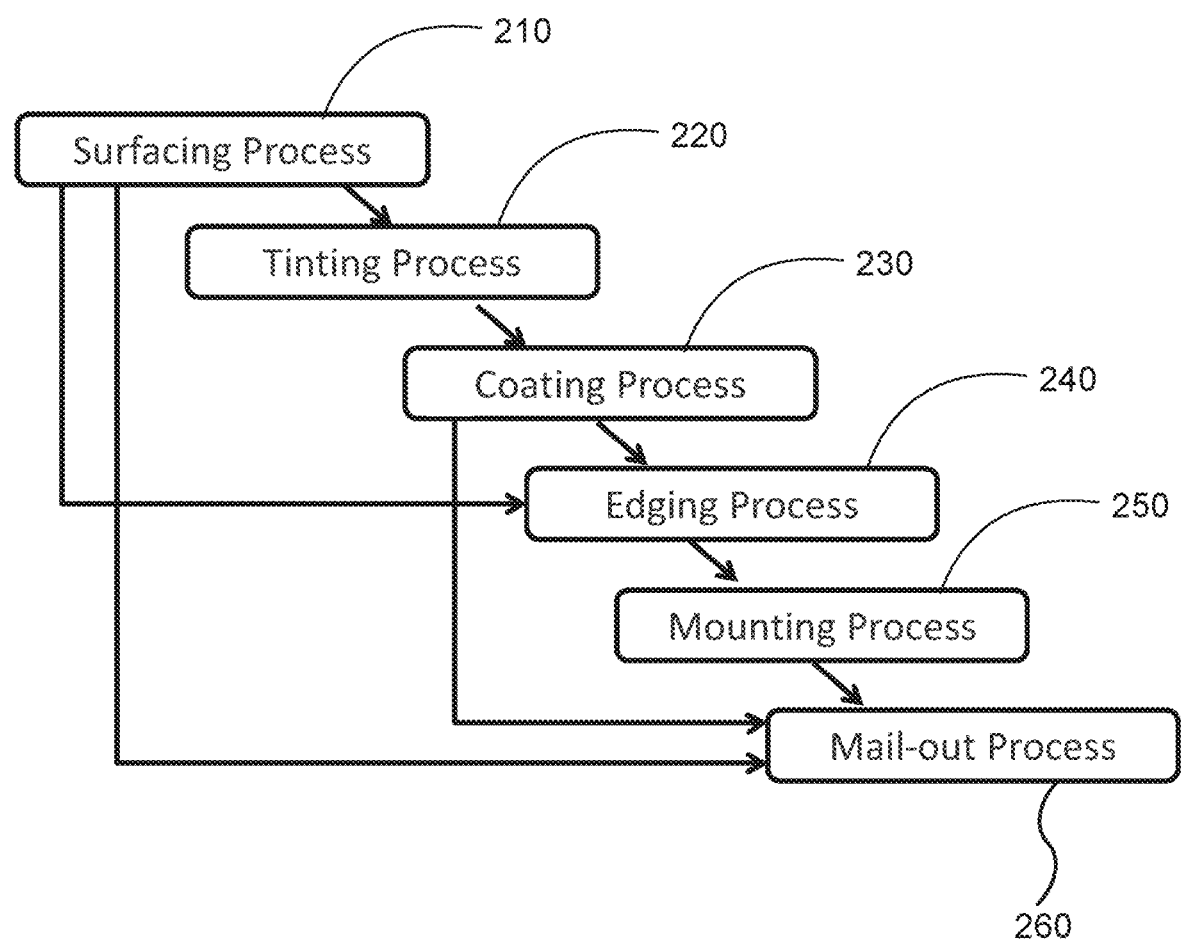
FIG. 2 shows a non-limiting example of process flows for processing steps within an optical manufacturing laboratory, according to certain implementations.

For example, FIG. 2 shows a simplified schematic view of processing steps in a laboratory, according to one non-limiting embodiment. These processing steps provide a foundation for logical groups that identify specific processes. FIG. 2 is a schematic drawing that demonstrates processing steps within a typical laboratory. In FIG. 2, arrows are shown indicating the work flow for respective orders. For a first subset of orders, all processes are performed. That is, the first set of orders is fulfilled by first performing a surfacing process 210. Then, first set of orders continues by performing a tinting process 220, followed by a coating process 230. Next, an edging process 240 is performed, and then a mounting process 250 is performed, concluding with a mailing out process 260.

For another subset of orders, some of the processes are omitted. For example, in one case the tinting process 220 and the coating process 230 are omitted, and in another case the edging process 240 and the mounting process 250 are omitted. These are merely non-limiting examples, and other processes, variations of the processes, and variations of the work flow (e.g., omitted processes) are within the spirit of the method, as would be understood by a person of ordinary skill in the art. Accordingly, the processes shown in FIG. 2 provide non-limiting examples of processing groups. However, processing groups can also apply to specific steps or processes or other attributes related to the process or the manufacturing order.

FIG. 4 shows a non-limiting example of logical groups 300 that relate to specific lab processes. For example, the logical groups 300 (also referred to as logic blocks) include surfacing groups 310, which are associated with the surfacing process 210, and coating groups 320, which are associated with the coating process 220. Other subgroups of the logic groups 310 can include tinting groups, edging groups, and mounting groups, for example.

In addition to using logical groups (also referred to as logic blocks), the methods described herein use performance indicators (PIs). PIs are reported for each OML and grouped by order group. These PIs can include (i) overall process time (end to end), (ii) process times for given manufacturing steps (e.g. surfacing, coating, edging), cost (e.g., for the entirety of the order or for respective manufacturing steps), (iii) quality indicators, and more.

The PIs are metrics that are useful to the routing decision process in order to route an order from one system to another. The PIs include, but are not limited to: (i) an average turn-around time; (ii) an average inter-company cost; (iii) an available capacity; and (iv) a quality rating. The average turn-around time for the order group can be defined relative to any given day or time. For example, an order received on a Friday might take longer to deliver than an order received on Monday if the production laboratory does not work full shifts on the weekend. The average inter-company cost for the order group can be defined over a configurable period of time. The available capacity can be defined with respect to the production site(s) for the order group. The quality rating can be measured, e.g., by the number of order rejects compared to the number of orders completed and/or other means of measurement, such as a customer rating system of 1 to 5 stars, or a ratio of likes to dislikes as ranked via social media or other means.

The methods and apparatuses described herein provide the PIs published by the OMLs to designated participants (e.g., the OMLs, ECPs, and/or an administrator) that engage/participate in the routing decisions. That is, the methods and apparatuses described herein provide a mechanism to determine to which sites (e.g., the participants) the PI data is to be distributed. In certain implementations, the methods define order groups and capture the PIs for the orders that apply to these order groups as the orders move through production. The methods can include an automated process for collecting these PIs forming them into a data stream and publishing or transmitting the data to the participating OMLs, ECPs, and systems.

In certain implementations, these tasks of publishing PIs, managing/organizing the PIs, defining order groups, and distributing the PIs to routing participants can be performed using web-services in real time.

For example, web-services can be used for the OMLs to receive requests for the PIs and then publish the PIs in a responsive manner. Alternatively or additionally, the PIs can be published by OMLs on a timed/periodic basis. Also, in certain implementations, the PIs can be published automatically, asynchronously whenever the OMLs generate updated information regarding the PIs. In addition to web services, the system of OMLs can publish the PIs using any known communication methods, such as through wireless communication, a local area network, a wide area network, and so forth. Here, the term "web-services" includes, e.g., cloud computing. In certain implementations, the PIs are published in on a public computer network, and the PIs are published in a secure manner using a blockchain technology, for example.

Regarding the process of transmitting/broadcasting the published PIs to the participants, either a centralized communication system or a distributed communication system can be used to deliver the published PIs to the participants. For example, in a centralized system, all of the PIs are published to a single entity (e.g., an administrator of the system) and the single entity collects and transmits the published PIs to the participants. Alternatively, in certain implementations of a distributed communication system, each OML publishes their PIs to each of the participants designated to receive the PIs. Additionally, a hybrid system can be used in which some communications are managed in a centralized manner, others are managed in a distributed manner, and still others are managed using aspects of both centralized and distributed communication.

Whether or not a centralized or distributed communication process is used, the published PIs can be transmitted to the participants (i) in a responsive manner, (ii) in a timed/periodic manner, (iii) in an asynchronous, ad hoc manner, or any combination thereof. For example, web-services can be used to transmit the published PIs to the participant in a responsive manner. Alternatively or additionally, the published PIs can be transmitted to the participants on a timed/periodic basis. Also, in certain implementations, the published PIs can be transmitted to the participants automatically when they are published by the respective OMLs. In addition to web services, the published PIs can be transmitted to the participants by any known communication method, such as through wireless communication, a local area network, a wide area network, and so forth. In this manner, the PIs are available to the ECPs or OMLs that would like to route orders to respective OMLs in the system/network. These routing assignments can be achieved, e.g., by logging the locations to which orders flow and/or by preconfiguring possible locations to which the orders could flow.

Figure 4A:
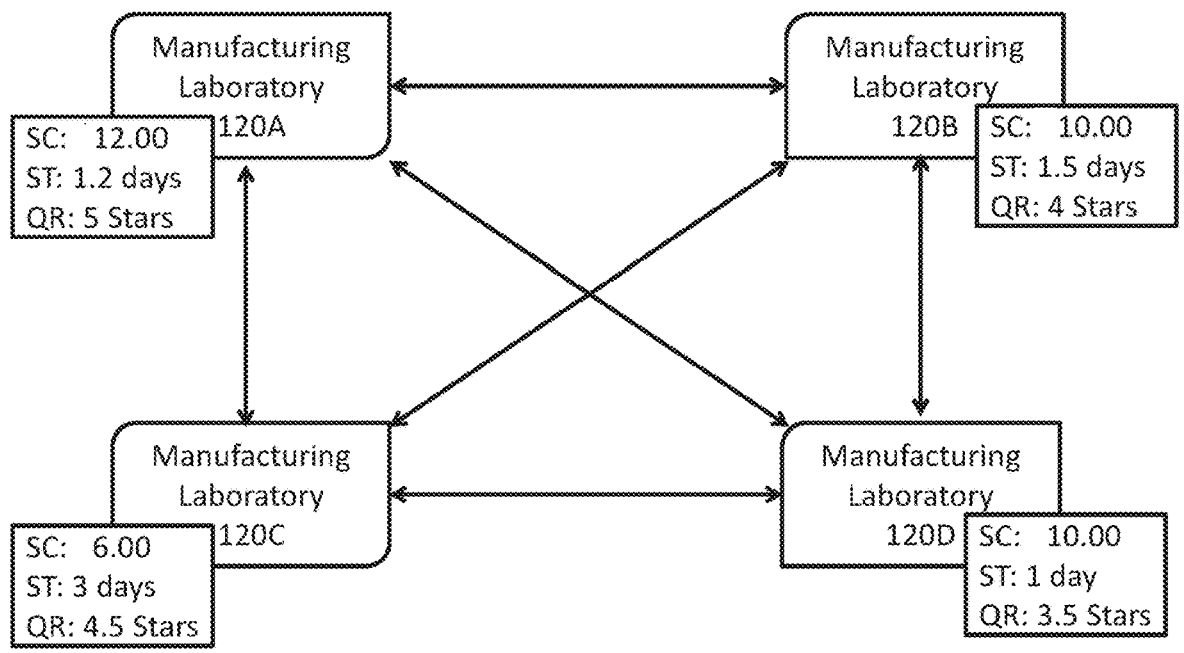
FIG. 4A shows a non-limiting example of a network of optical manufacturing laboratories, each of the laboratories publishing to the others their respective performance indicators (PIs), according to certain implementations.

FIG. 4A shows a non-limiting example of a network of four different OMLs 120A-D having different PIs, each of the OMLs publishing in a distributed manner their respective PIs with each of the other three OMLs in this particular network. Although these OMLs 120A-D share PIs, they do not necessarily route orders to all other OMLs in the network. A first OML 120A publishes the PIs of: (i) a surfacing cost (SC) of 12.00 (e.g., 12 of a given monetary unit, such as US dollars), (ii) a surfacing time (ST) of 1.2 days, and (iii) a quality rating (QR) of 5 stars. A second OML 120B publishes the PIs of: (i) an SC of 10.00, (ii) an ST of 1.2 days, and (iii) a QR of 5 stars. A third OML 120C publishes the PIs of: (i) an SC of 6.00, (ii) an ST of 3 days, and (iii) a QR of 4.5 stars. A fourth OML 120D publishes the PIs of: (i) an SC of 10.00, (ii) an ST of 1.0 days, and (iii) a QR of 3.5 stars.

Figure 4B:
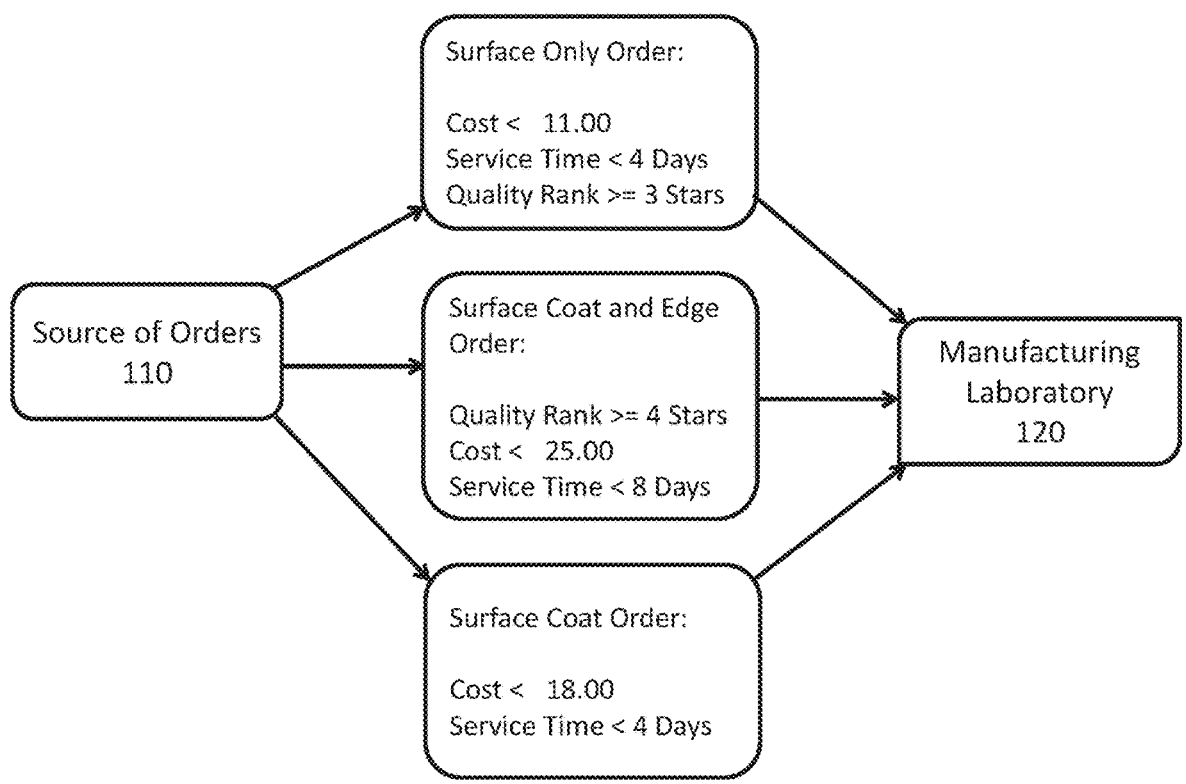
FIG. 4B shows a non-limiting example of manufacturing orders being associated with logic blocks, the orders being sent from a Source of Orders to a Manufacturing Laboratory, and the logic blocks expressing preferences/requirements corresponding to the PIs and arranging the preferences/requirements in order of priorities, according to certain implementations.

FIG. 4B shows a non-limiting example of a source of order 110 sending three different orders to an OML. The orders include respective requirements and priorities arranged according to logic blocks corresponding to the PIs. FIG. 4B illustrates that logic blocks that can be used to best service the preference of the ordering entity (i.e., the source of order 110). Note that, for each particular manufacturing order, the requirements corresponding to the PIs can be arranged/ranked differently. Here, a first order is a "surface only order," and the priorities of the requirements are: first the cost is less than 11.00, second the service time is less than 4 days, and third the quality rank is equal to or exceeds 3 stars. A second order is a "surface coat and edge order," and the priorities of the requirements are: first the quality rank is equal to or exceeds 3 stars, second the cost is less than 25.00, and third the service time is less than 8 days. A third order is a "surface coat order," and the priorities of the requirements are: first the cost is less than 18.00, and second the service time is less than 4 days.

In certain implementations, the prioritized requirements of a manufacturing order are processed by ensuring the highest priorities are satisfied, and then, if all of the requirements cannot be simultaneously satisfied, routing the manufacturing order to an OML or combination of OMLs, that satisfies all of the highest priorities and minimizes the degree to which the lower prioritizes fail to be satisfied. For example, this constrained optimization problem can be addressed using an objective function in which requirements that are not fully satisfied are combined using a weighted sum of difference measures between the desired performance and the actual performance. For example, for a surface order having priorities 1) ST<3, 2) SC<9:00, and 3) QC≥4.5, the first priority is satisfied by all of the OMLs in FIG. 4A except OML 120C, but none of these satisfies the second priority. Accordingly, a best option can be determined by solving the constrained optimization problem $$\underset{i}{\mathrm{argmin}}\{w_1|KPI_1^{(d)} - KPI_{1,i}^{(a)}|^p + w_2|KPI_2^{(d)} - KPI_{2,i}^{(a)}|^p\}, \text{s.t. } SC < 3$$

wherein $KPI_1^{(d)}$ is the desired value for the first unmet priority (i.e., an SC of 9.00), $KPI_{1,i}^{(a)}$ is the actual PI value of the ith OML for the first unmet priority (i.e., 12.00 for OML120A, 10.00 for OML120B, etc.), $KPI_2^{(d)}$ is the desired value for the second unmet priority (i.e., an QC of 4.5), $KPI_2^{(a)}$ is the actual PI value of the ith OML for the second unmet priority (i.e., 4.5 for OML120A (when the actual PI value satisfies the requirement, this can be indicated by setting the actual PI value to the desired value such that the difference is zero), 4.0 for OML120B, etc.), $w_1$ and $w_1$ are respective weights, and $|\bullet|^p$ is an absolute value raised to the power p. For example, when p=2, the constrained optimization problem minimizes the weighted least square error. This is just one non-limiting example, and other optimization function and variations thereof can be used without departing from the spirit of the method.

Further, the PIs can include available capacity. When routing many orders to the OMLs, multiple orders sent to the same OML can diminish the available capacity. For example, even if a first OML ranks as the preferred routing destination for 10,000 orders, the first OML might only have capacity for 5,000 new orders. Thus, 5,000 of these orders might be better routed to other OMLs. Choosing which 5,000 orders of the 10,000 orders would be optimal to send to the other OMLs can be a complex, multi-dimensional problem. For example, the above optimization problem might be expanded to minimize an aggregated error over all 10,000 orders. As discussed later, a machine-learning method such as a deep learning network can learn to efficiently and robustly approximate the optimal selection of where to route which orders.

In certain implementations, the PI-based routing logic can be based on previous sets of routing rules, except instead of the routing rules being fixed or hardwired, the routing rules can be based on the frequently reported PIs from the labs. Thus, the routing rules can be dynamic and change to reflect changes at the respective OMLs and to be based on actual information regarding available capacity at the respective OMLs, for example.

Figure 5:
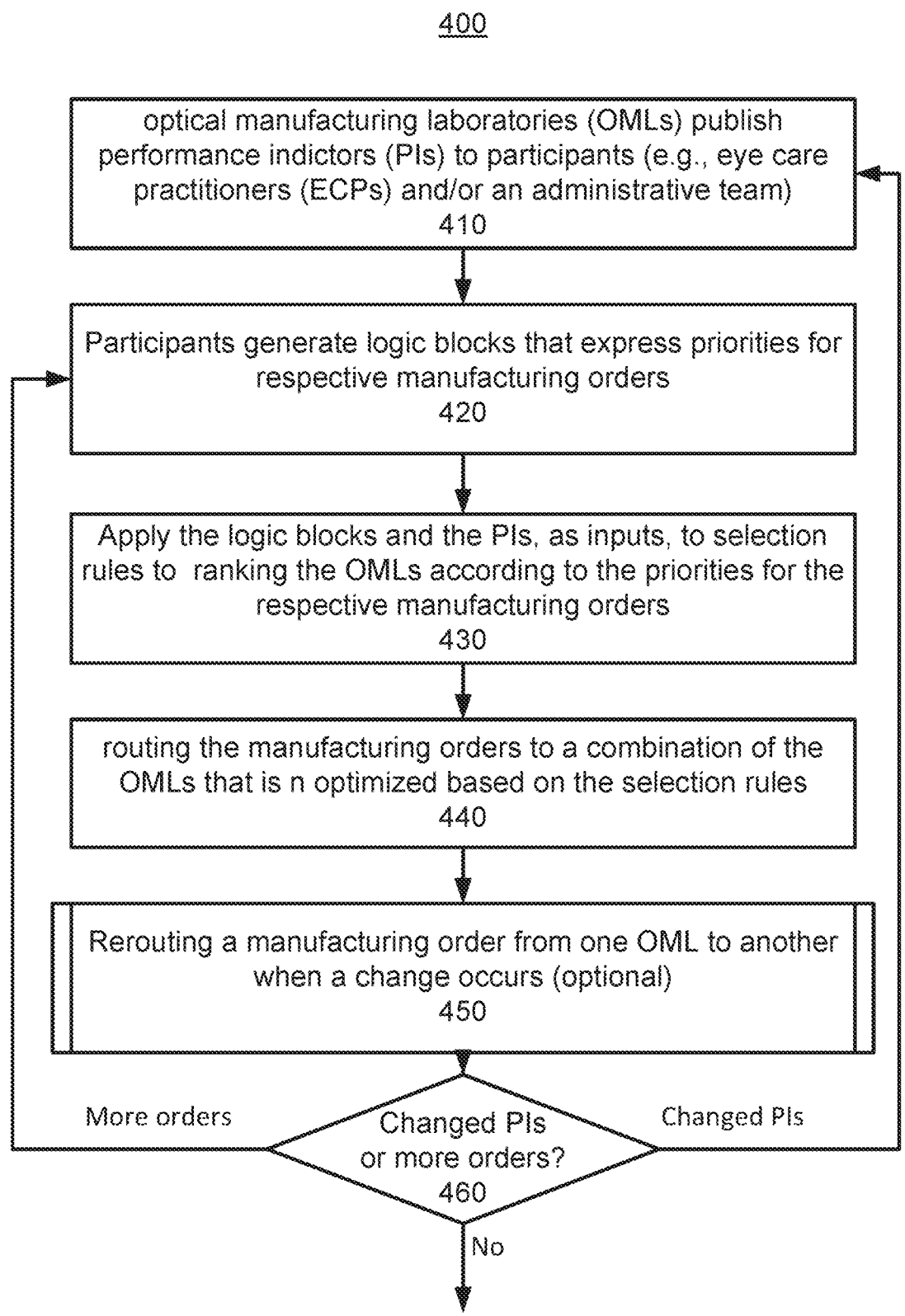
FIG. 5 shows a non-limiting flow diagram of a method for routing orders to manufacturing laboratories based on the PIs and based on the logic blocks, according to certain implementations.

FIG. 5 shows a flow diagram of a method 400 for communicating PIs throughout a manufacturing system/network and performing routing logic. Method 400 is a non-limiting example of a PI-based routing system, and variations, such as variations in the order of steps or in how particular steps are performed, are within the scope of the PI-based routing system without departing from the spirit of the method.

In step 410 of method 400, OMLs publish the PIs to one or more participants. The one or more participants can include one or more ECPs and an administrative team of the OMLs. In certain implementations, the participants can also include the other OMLs (i.e., other OMLs can use the PIs published by a first OML to determine whether it would be better, more efficient to reroute manufacturing orders to the first OML, especially when a change affects the priorities or specifications of an order or affects the PIs of the OMLs).

In step 420 of method 400, logic blocks are generated to represent and express priorities and preferences for respective manufacturing orders. For example, a preference logic block can be a combination of a data structure and logic rules that can be associated and passed with the order. This logic block is used by a routing entity (e.g., an ECP, administrator, or even another OML) to understand priorities and preferences of the original order as expressed by the customer that place that order. For example, one order might rank turn-around time higher than cost, whereas another order might rank cost as more important than turn-around time.

The routing system uses the information in the logic blocks to manage the routing of a given order and/or to manage the order within the OML. For example, the logic blocks can be used in deciding to route the order to another laboratory for processing, so the original preferences and requirements of the customer and originating laboratory can be honored/fulfilled throughout the manufacturing process regardless of where the order is sent.

In step 430 of method 400, routing logic is performed when a selection process (e.g., selection rules, a decision tree, a machine learning method (such as a DL network), or a combination thereof) receives as inputs the logic blocks and the PIs as inputs to selection rules. The selection process then selects/ranks the OMLs in accordance with the priorities for the respective manufacturing orders. For example, each of the manufacturing orders can be paired with a respective OML to which the manufacturing order will be routed.

In certain implementations, the selection process includes using a utility function to evaluate the PIs of the respective OMLs in accordance with the logic blocks corresponding to the respective manufacturing order to determine which of the OMLs best satisfies the priorities of the given manufacturing order as expressed by the logic block corresponding to the given manufacturing order. The utility function can be, e.g., an objective function (i.e., a function in constrained or unconstrained optimization problem) similar to that discussed above. The selection process can be performed by considering orders one at a time, collectively in small groups (e.g., a large group of order can be partitioned into a series of smaller groups), or collectively as one large group.

In step 440 of method 400, the manufacturing orders are routed to the respective OMLs according to the selection rules. The routing is based on a combination of the OMLs that is determined to be optimal based on the particular PIs and the priorities and requirements (also referred to herein as preferences) of the respective orders. In certain implementations, the logic blocks will order the requirements as higher priorities than the preferences, wherein the requirements are conditions that must be satisfied, and the preferences are conditions that do not necessarily have to be satisfied, but best efforts should be made to satisfy the preference conditions. A flag can be used to indicate whether a condition in the logic block is a requirement or a preference (e.g., a binary value of "0" can indicate that a condition with respect to one or more PIs is a preference, and a binary value of "1" can indicate that the condition is a requirement).

In process 450 of method 400, a manufacturing order can be rerouted from a first OML to a second OML. This step is optional, and can be omitted in certain implementations. That is, when fulfilling the manufacturing order at the second OML is determined to be more optimal than would be fulfilling the manufacturing order at the first OML, the first OML, which currently holds the manufacturing order can reroute the manufacturing order to the second OML, thus achieving a more optimal result. This scenario might arise when the PIs are updated and the first OML no longer satisfies all of the requirements/preferences of the manufacturing order, but the second OML does satisfy all of the requirements/preferences in the logic block. Additionally, this scenario might arise when the requirements/preferences are updated and the first OML does not satisfy all of the updated requirements/preferences of the manufacturing order, but the second OML does.

In step 460 of method 400, an inquiry is performed regarding whether or not the PIs have changed or whether additional orders have been received. If additional orders have been received but there are no changes to the PIs, then method 400 proceeds from step 460 to step 420. If there are additional changes to the PIs, then method 400 proceeds from step 460 to step 410. For example, in certain implementations, PIs are periodically published at predetermined time intervals. When the predetermined time intervals have elapsed, method 400 would return to step 410, and rank ordering of the OMLs based on respective PIs can be adjusted according to changes in the PIs published by the OMLs.

Figure 6:
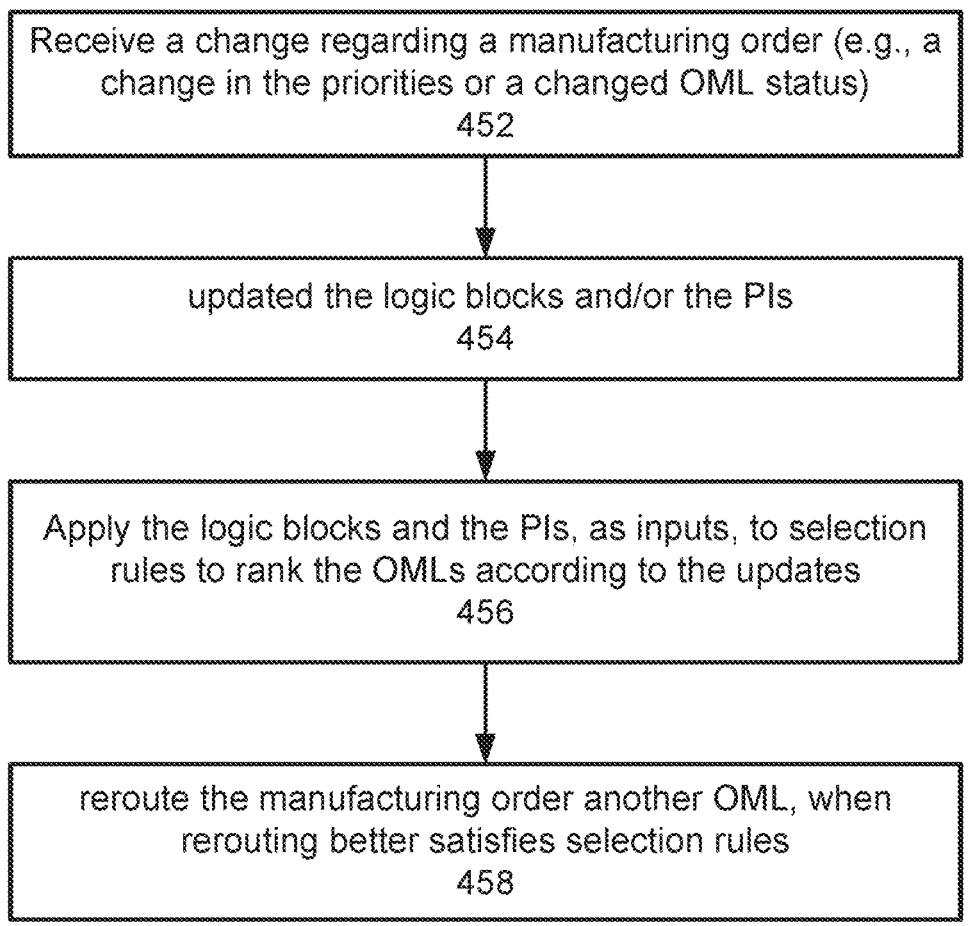
FIG. 6 shows a non-limiting flow diagram of a process for rerouting orders to other manufacturing laboratories based on changes to the PIs and/or the logic blocks, according to certain implementations.

FIG. 6 shows a flow diagram of a non-limiting implementation of process 450.

In step 452 of process 450, a change is received. For example, the PIs of the OMLs are updated or the requirements/preferences of the orders are updated.

In step 454 of process 450, the PIs are updated and/or the priorities and preferences are updated. For example, in certain implementation, PIs are periodically published at predetermined time intervals. When the new PIs publish, the rank ordering of the OMLs based on respective PIs can be adjusted to reflect the most recent PI values.

In step 456 of process 450, the order is rerouted based on an updated application of the route-selection logic (also referred to as the route-selection process, the routing logic, or the routing process) to the most recent PIs of the OMLs using the most recent requirements/preferences of the order.

In step 458 of process 450, the order is rerouted based on the updated results of the route-selection logic. For example, the order might have been sent to a first OML. However, since the order was routed to the first OML, the PIs of the first OML have changed such that the first OML no longer satisfies all of the requirements/preferences of the manufacturing order, but a second OML does satisfy all of the requirements/preferences.

Additionally, the order might be rerouted when the requirements/preferences are updated and the first OML does not satisfy all of the updated requirements/preferences of the manufacturing order, but the second OML does. For example, in certain implementations, the logic blocks are integrated and sent together with the manufacturing orders (e.g., in the metadata), and changes to the priorities and/or preferences can be made at the originating ECP. For example, a customer might initially place an order with a four day preference for the service time, and then the customer might later change its mind and require that the order be rushed and be completed in just two days, while agreeing to pay a higher price for quicker delivery. In this case, the original optimal routing decision might have been to send the order to a first OML that has large throughput with low manufacturing costs but longer service time, whereas an updated optimal routing decision would be to send the order to a second OML with smaller throughput, higher costs, but faster service times.

To achieve this dynamic rerouting after the order has been sent to the first OML, the logic block is sent to the first OML with the order, and changes to the order are updated with the order at the first OML. For example, the OML receives a change from the ECP regarding a given manufacturing order, and logic block at an OML is updated to reflect the received change in the given manufacturing order. Finally, if the updated analysis in step 456, which is generated by applying the updated logic block to the route-selection logic, indicates that another OML would be more optimal for processing the order, then the order is rerouted to the more optimal OML. Even when the order is not rerouted, the change in the logic block can signal changes in the manufacturing process. For example, the original order might be for surfacing only, and the change might signal that both surfacing and coating are to be performed. Accordingly, even if the order is not rerouted, the OML will change the manufacturing process to perform both surfacing and coating, rather than just surfacing.

Thus, process 450 establishes a mechanism whereby alterations can be made to a logic block at the OML currently designated to fulfil the order, and the logic block at the OML can be updated while the order is being queued to be processed. For example, if service time is not initially an element of the logic block, but the customer suddenly needs his/her eyewear very soon, an update to the logic block to rush the order can be sent to the OML while the order is in the queue, allowing the route-selection logic to be applied to account for changes and the order to possibly be rerouted. In this manner, the routing system can dynamically adjust the subsequent steps in processing or reroute the order to account for the new information that has been added to the logic block.

In certain implementations, the logic blocks have elements including, e.g., (i) a time to complete manufacturing, (ii) a manufacturing cost, (iii) a quality rating, (iv) surfacing manufacturing capabilities, (v) edging manufacturing capabilities, (vi) coating manufacturing capabilities, (vii) an inventory of availability of a component used in manufacturing the order, and/or (viii) shipping costs.

In certain implementation, the PIs include, e.g., (i) an overall process time, (ii) process times for sub-processes (e.g., surfacing, tinting, coating, edging, mounting, and mailing), (iii) a production capacity, (iv) manufacturing capabilities, (v) a cost (e.g., an overall cost and sub-process costs), (vi) inventories of availability of components, and (vii) quality indicators.

Figure 7:
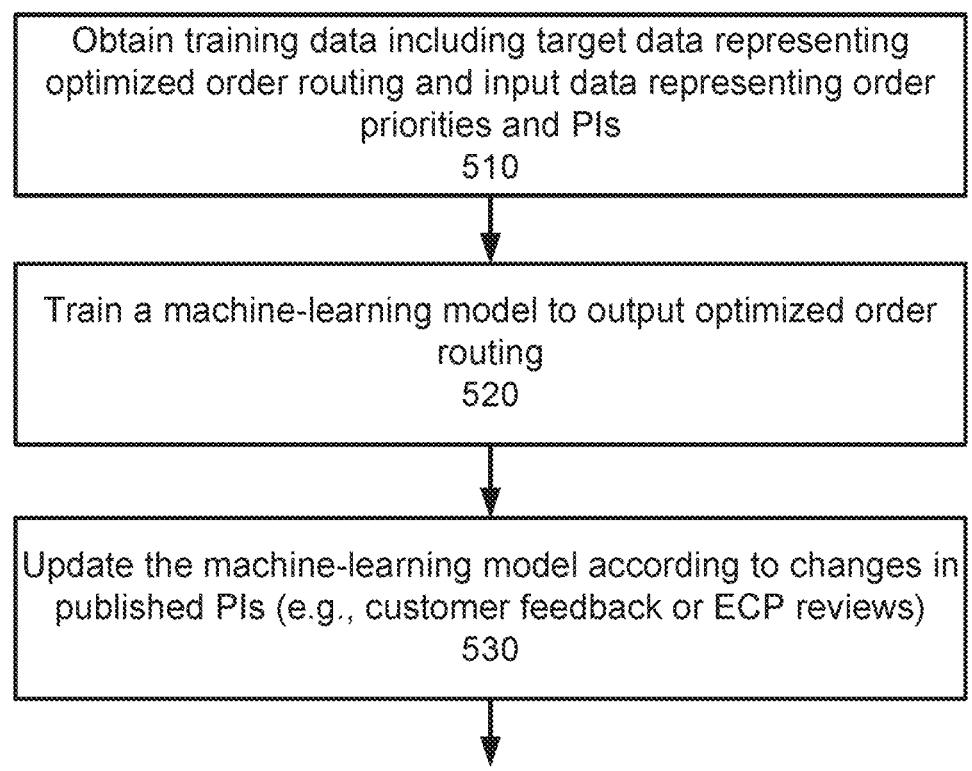
FIG. 7 shows a non-limiting flow diagram of a process for training a machine-learning model to perform the routing logic, according to certain implementations.

FIG. 7 shows a method 500 for training a machine-learning model to perform the route-selection logic.

In step 510 of process 500, training data is obtained to train the machine-learning model. For example, the training data can include target data and input data, with the goal that the machine-learning model learns from the training data how to reproduce the target data, when the input data is provided as an input to the machine-learning model. For example, the input data can represent respective sets of logic blocks and PIs, and the target data can be routing decisions that have been optimized according to the logic blocks and PIs. The optimized routing decisions can be generated using, e.g., a brute force search or a using an older system with a huge complicated set of rules. For example, the machine-learning model can be a deep-learning (DL) network that is initially trained to reproduce the routing patterns of a previous system with a huge complicated set of rules, and then, through reinforcement learning, the DL network can learn over time to produce better result than the previous system by using a data-driven approach to learn implicit patterns in the data.

In step 520 of process 500, the machine-learning model is trained using the training data to receive logic blocks from manufacturing orders and PIs from OMLs as inputs and then route the manufacturing orders to a combination of the OMLs that is optimal. A non-limiting example is provided below for how this training is performed for DL networks by optimizing a loss function.

In step 530 of process 500, data is gathered/aggregated regarding how the system is performing and used to update and improve the machine-learning model (e.g., reinforcement learning). In this way, the machine-learning model can learn to recognize trends and make corrections in anticipation of certain developments. For example, the gathered data can include changes in throughput at respective OMLs as a function of time to predict whether an OML that has steadily been decreasing in volume of orders processed per day will continue to decrease and by how much. For example, decreasing manufacturing volume might arise from more frequent breakdown of machinery as the machinery ages, but after scheduled maintenance, rebuild, or replacement of machinery, the manufacturing volume might increase again before slowly decreasing over time. The machine-learning model can learn such patterns and trends and project these trends forward in time to better distribute and route the manufacturing orders to achieve better load balancing and optimize the priorities and preferences expressed in the logic blocks of the individual manufacturing orders.

The data used to improve the machine-learning model can also include customer feedback or ECP reviews from fulfilled orders. For example, a PI received by the ECPs can be a quality rating (QR) indicating the quality or products and/or processing produced the respective OMLs. This QR can be based on customer feedback and/or reviews from the ECPs regarding previous orders manufactured by the respective OMLs. The customer feedback and/or reviews from the ECPs are then monitored for changes. Using this continuous stream of customer feedback and/or reviews from the ECPs, the machine-learning model is trained to predict trends in the QR values. Similar other PIs can be monitored for trends and patterns, and the machine-learning model can be trained to learn these implicit patterns and make better routing decisions based on the monitored PIs.

For example, a given OML might show a pattern that when the backlog of orders exceeds a certain threshold, the given OML increases production volume by 10% but the customer reviews indicate that quality then falls below an allowable threshold. Then, the machine-learning model can make better decisions that keep the backlog of orders below the certain threshold. That is, by the PIs, including for example the customer feedback, together with the logic blocks in inputs to the machine-learning model (which performs the route-selection logic, i.e., selection rules), the optimal combination of OMLs for routing the manufacturing orders can be determined.

In view of the above, the combination of method 400 and method 500 provides a system whereby the rankings and aggregation of OMLS can be recalculated or revised periodically. For instance, in one example, each night the rankings among labs are recalculated based on a configurable time period (e.g. orders received or shipped within the last two weeks) such that the ranks of the OMLs and the aggregated data of the OML performance represent current states of the OMLs. Additionally, the combination of method 400 and method 500 can be used to identify trends in the same or alternate time frames and may calculate trend lines, confidence levels, standard deviations, and other statistical criteria that can be used to hone and improve the routing decisions based on the most recent data collected. Moreover, the combination of method 400 and method 500 can be used to build dashboards and reports to show the current state of work in process across the network of production laboratories by order group, and the dashboards and reports can show current PIs, values for the OMLs, the number of orders routed to the OMLs, etc.

Further, the combination of method 400 and method 500 can be used to assess the mix of manufacturing order types, the location of the manufacturing orders, the throughput (actual and predictive), and the flow of an order through a given laboratory or group of laboratories. For example, one laboratory might do surfacing of the order and another might do the edging function.

In certain implementations, the system can use the published PIs to capture the actual throughput of various order types or groups in each stage of the manufacturing process. Further, the system can calculate/estimate the minimum, maximum, and optimal counts/volume of orders for each stage of the manufacturing. For example, the system can track the maximum throughput of a given station or stations (e.g. an individual and specific surfacing blocker, or group of several surfacing blockers) by day of week and by hour of the day and by shift or even by individual that is operating the blocker. For a given blocker or OML, the minimum and maximum counts per day for a given manufacturing process/stage can be used to provide confidence intervals for predicting how many counts the given blocker or OML will achieve in the future.

Accordingly, the system can use the gathered data (including past PIs) to predict capacity for next week based on history of the last two weeks, for example. Additionally data can be used to supplement historical data. For example, historical data alone is insufficient to foresee that the lab plans to add an additional three surfacing blockers on line next week, so capacity will change, or that three blockers are taken offline for maintenance during a four hour period on Saturday on a monthly basis. Thus, the historical data can be supplemented with information regarding known changes and maintenance to accelerate the learning process and make better predictions.

That is, the processes and methods described herein for capturing and assessing availability, throughput, yield, and other aspects of the manufacturing process can gather information that includes both a component of real-time and historical monitoring and also a component of scheduling and planning that can be administered by the laboratory's personnel. By so doing, the processes and methods described herein can build a process to capture planned scheduling of shift work, maintenance windows, holidays, and more that can be used in forward looking and predictive analytics.

Figure 8A:
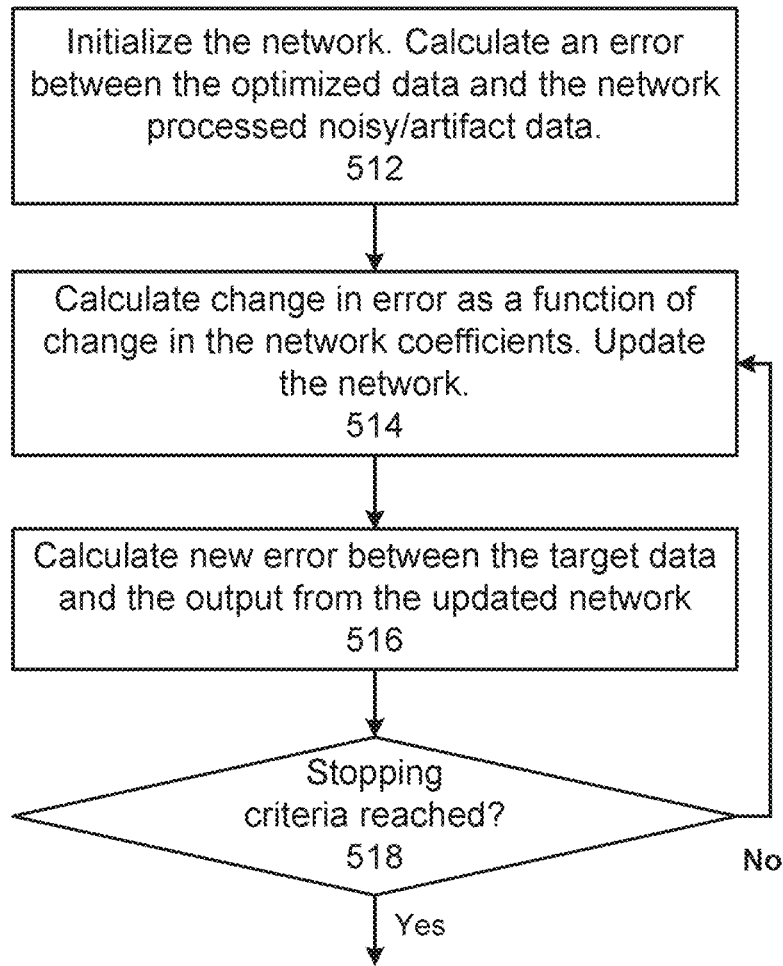
FIG. 8A shows a non-limiting flow diagram of a process for training a deep-learning (DL) network by iteratively adjusting coefficients of the DL network to optimize a loss function, according to certain implementations.
Figure 8B:
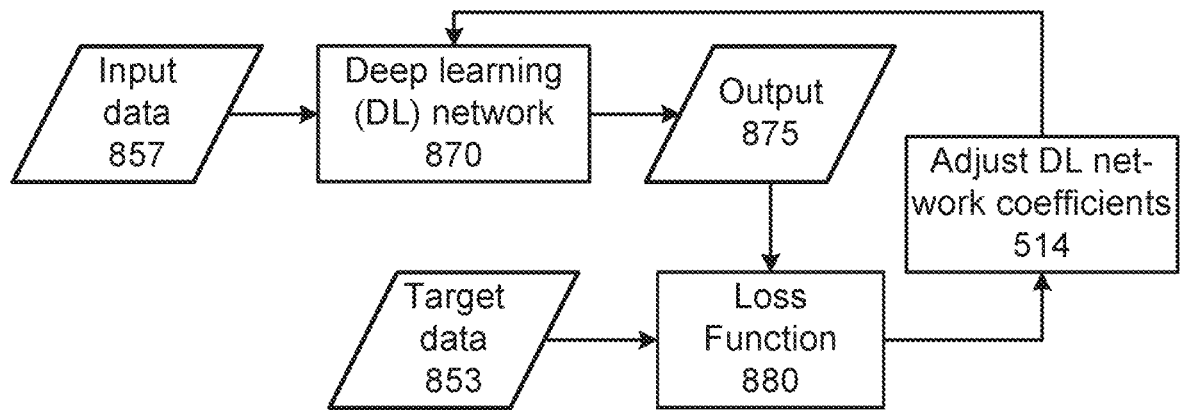
FIG. 8B shows a non-limiting schematic diagram of data flow when training the DL network, according to certain implementations.

FIGS. 8A and 8B show a flow diagram of one implementation of the training process 510. In process 510, input data 857 and target data 853 are used as training data to train a DL network 870, resulting in the DL network 870 being output from step 518 of process 510. The DL training process 510 trains the DL network 870 using sets of orders as the input data 857 (e.g., each set in the input data can include logic blocks corresponding to a set of manufacturing orders) that are paired with corresponding sets of optimal routing as the target data 853 (e.g., a brute force search can be used to determine the optimal routing of a given set of orders in the input data). Thus, the input data 857, in combination with the target data 853, can be used to train the DL network 870 such that when the input data 857 is applied to the DL network 870 the output 855 approximately matches the target data 853.

In process 510, a set of training data is obtained, and the network 870 is iteratively updated to reduce the error (e.g., the value produced by a loss function 880). The DL network infers the mapping implied by the training data, and the loss function 880 produces an error value related to the mismatch between the target data 853 and the output 875 produced by applying a current incarnation of the DL network 870 to the input data 857. For example, in certain implementations, the loss function 880 can use the mean-squared error to minimize the average squared error. In the case of a multilayer perceptron (MLP) neural network, the backpropagation algorithm can be used for training the network by minimizing the mean-squared-error-based loss function using a (stochastic) gradient descent method.

In step 512 of process 510, an initial guess is generated for the coefficients of the DL network 870. For example, the initial guess can be based on one of a LeCun initialization, an Xavier initialization, and a Kaiming initialization.

Steps 512 through 518 of process 510 provide a non-limiting example of an optimization method for training the DL network 870.

An error is calculated (e.g., using a loss function 880) to represent a measure of the difference (e.g., a distance measure) between the target data 853 (i.e., ground truth) and the output 875. The error can be calculated using any known loss function 880 or distance measure. Further, in certain implementations the error/loss function can be calculated using one or more of a hinge loss and a cross-entropy loss. In certain implementations, the loss function 880 can be the lp-norm of the difference between the target data and the result of applying the input data to the DL network 870. Different values of "p" in the lp-norm can be used to emphasize different aspects of the noise. Further, a weighting mask (e.g., based on the attenuation coefficient of signal intensity) can be applied on a pixel-by-pixel basis to the difference between the target data and the result generated from the input data. In certain implementations, rather than minimizing an lp-norm of the difference between the target data and the result from the input data, the loss function 880 can represent a similarity (e.g., using a peak signal-to-noise ratio (PSNR) or a structural similarity (SSIM) index).

In certain implementations, the network 870 is trained using backpropagation. Backpropagation can be used for training neural networks and is used in conjunction with gradient descent optimization methods. During a forward pass, the algorithm computes the network's predictions based on the current parameters θ. These predictions are then input into the loss function, by which they are compared to the corresponding ground truth labels (i.e., the high-quality target data 853). During the backward pass, the model computes the gradient of the loss function with respect to the current parameters, after which the parameters are updated by taking a step of size of a predefined size in the direction of minimized loss (e.g., in accelerated methods, such that the Nesterov momentum method and various adaptive methods, the step size can be selected to more quickly converge to optimize the loss function).

The optimization method by which the backprojection is performed can use one or more of gradient descent, batch gradient descent, stochastic gradient descent, and mini-batch stochastic gradient descent. The forward and backwards passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Figure 3:
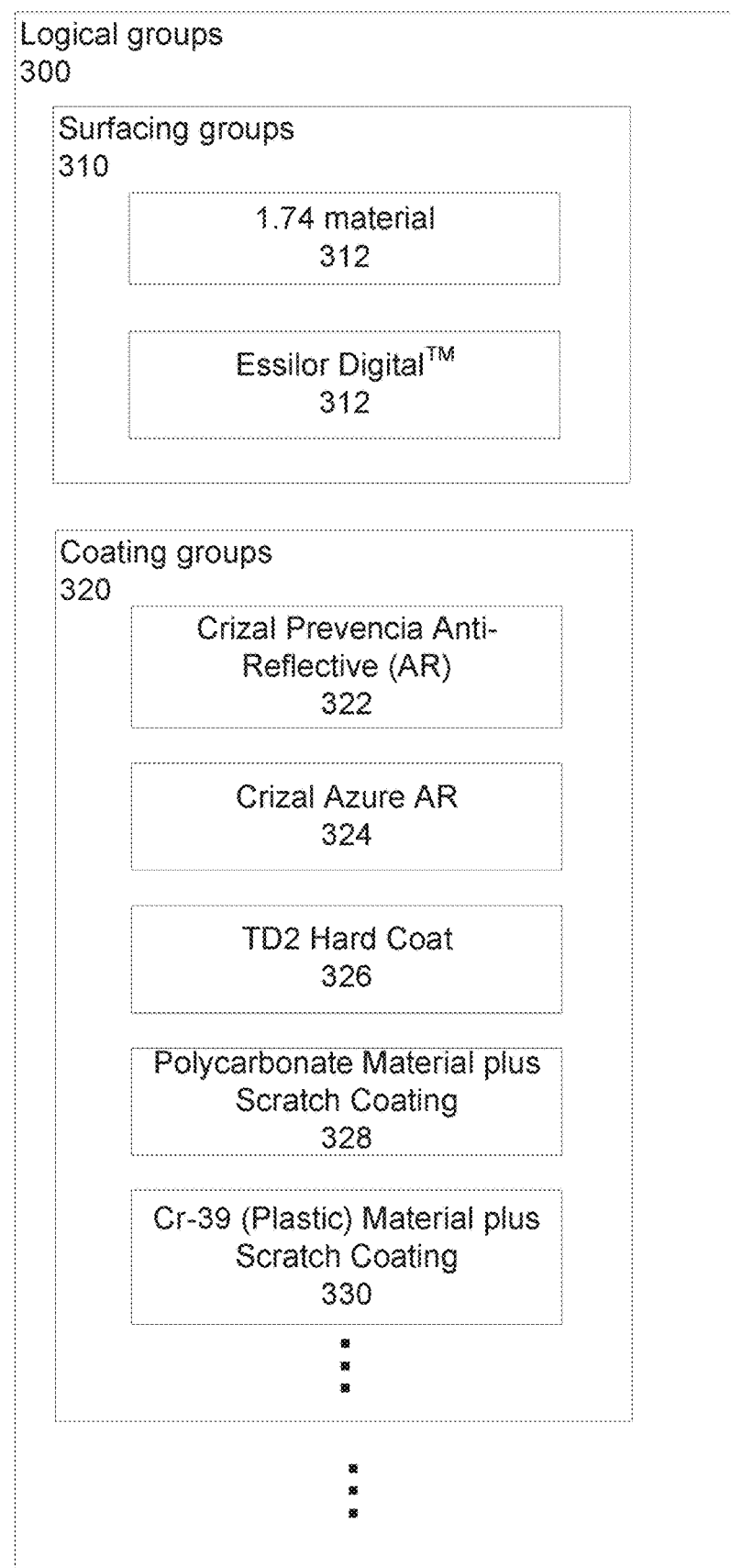
FIG. 3 shows a non-limiting example of logical groupings that can be used when performing routing logic, according to certain implementations.

Returning to FIG. 3, step 514 of process 510 determines a change in the error as a function of the change in the network can be calculated (e.g., an error gradient), and this change in the error can be used to select a direction and step size for a subsequent change to the weights/coefficients of the DL network 870. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 514 of process 510, a new set of coefficients are determined for the DL network 870. For example, the weights/coefficients can be updated using the changed calculated in step 514, as in a gradient descent optimization method or an over-relaxation acceleration method.

In step 516 of process 510, a new error value is calculated using the updated weights/coefficients of the DL network 870.

In step 518, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations is reached. When the stopping criteria is not satisfied the training process performed in process 510 will continue back to the start of the iterative loop by returning and repeating step 514 using the new weights and coefficients (the iterative loop includes steps 514, 516, and 518). When the stopping criteria are satisfied the training process performed in process 510 is completed.

Figure 9:
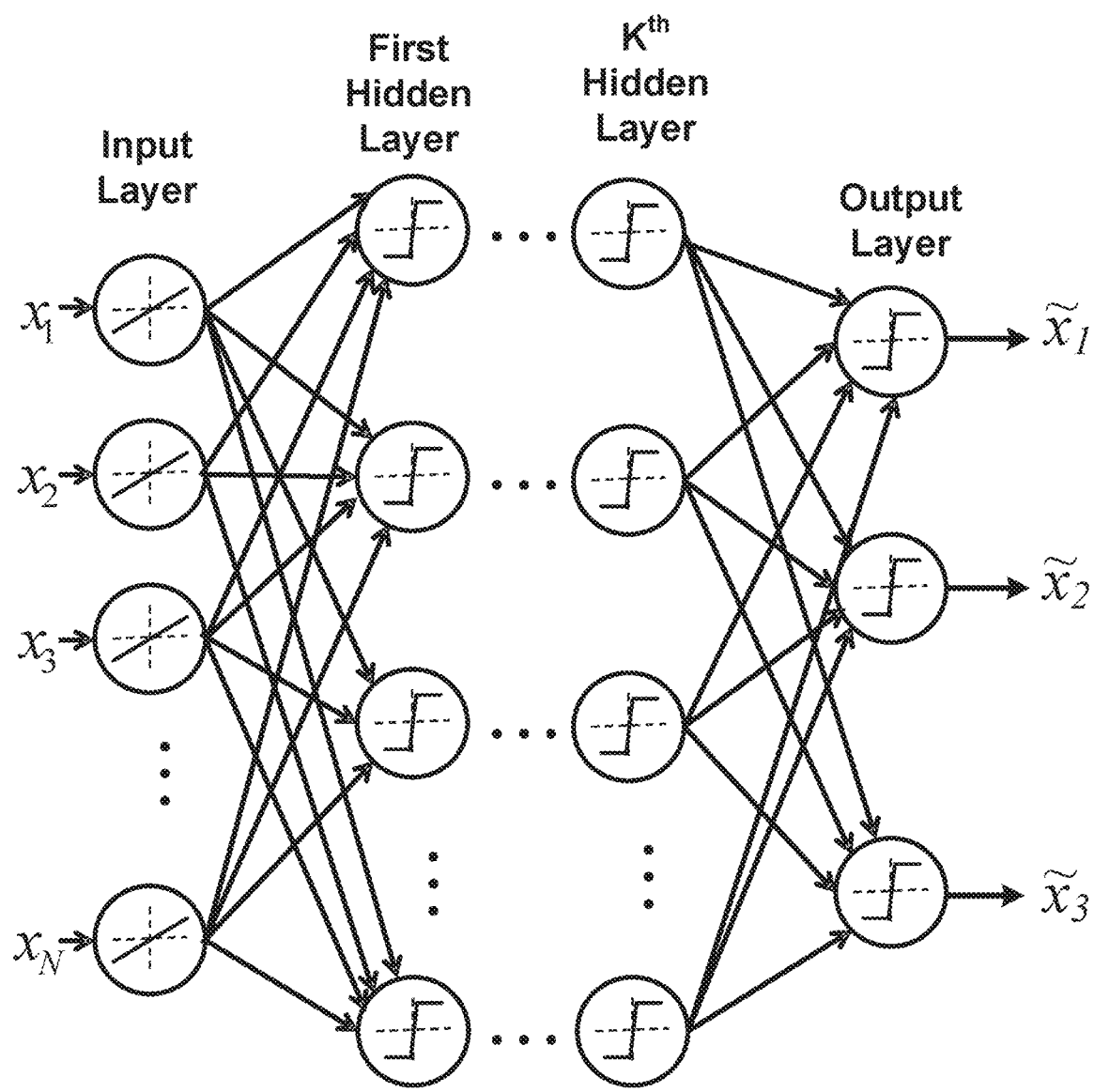
FIG. 9 shows an example of a DL network, according to one implementation.

FIG. 9 shows an example of the inter-connections between layers in the DL network 870. The DL network 870 can include fully connected, convolutional, and the pooling layer, all of which are explained below. In certain preferred implementations of the DL network 870, convolutional layers are placed close to the input layer, whereas fully connected layers, which perform the high-level reasoning, are place further down the architecture towards the loss function. Pooling layers can be inserted after convolutions and provide a reduction lowering the spatial extent of the filters, and thus the amount of learnable parameters. Activation functions are also incorporated into various layers to introduce nonlinearity and enable the network to learn complex predictive relationships. The activation function can be a saturating activation function (e.g., a sigmoid or hyperbolic tangent activation function) or rectified activation function (e.g., the Rectified Linear Unit (ReLU) applied in the first and second examples discussed above). The layers of the DL network 870 can also incorporate batch normalization, as also exemplified in the first and second examples discussed above.

FIG. 9 shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function is defined as a composition of other functions, which can further be defined as a composition of other functions. This can be conveniently represented as a network structure, with arrows depicting the dependencies between variables, as shown in FIG. 9. For example, the ANN can use a nonlinear weighted sum, where K (commonly referred to as the activation function) is some predefined function, such as the hyperbolic tangent.

In FIG. 9, the neurons (i.e., nodes) are depicted by circles around a threshold function. For the non-limiting example shown in FIG. 9, the inputs are depicted as circles around a linear function, and the arrows indicate directed connections between neurons. In certain implementations, the DL network 870 is a feedforward network.

Figure 10:
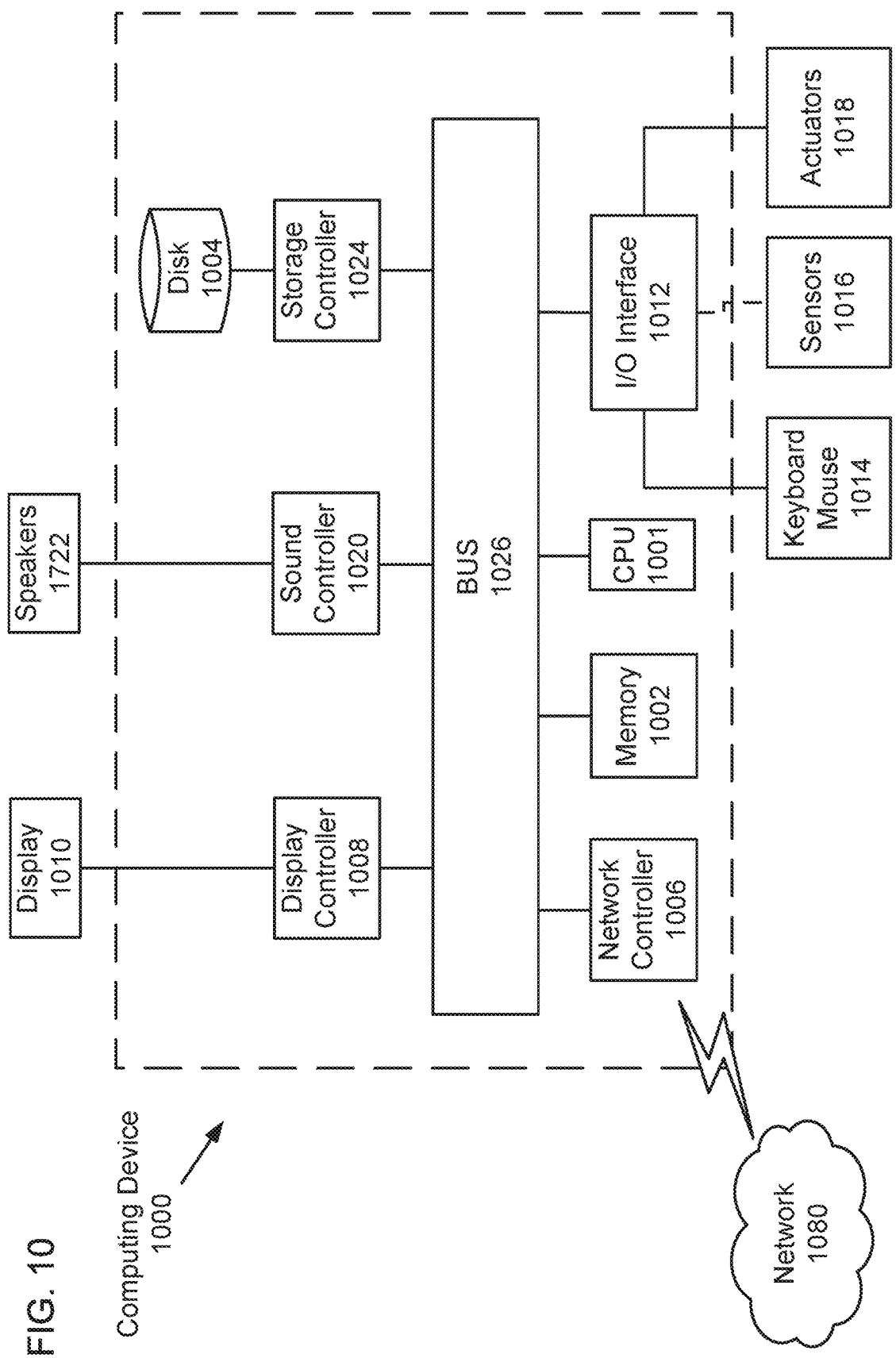
FIG. 10 shows an example of a computing device, according to one implementation.

Next, a hardware description is provided for a computing device 1000 that performs various steps of methods 400 and 500. For example, each source of order 110, manufacturing laboratory 120, and server can include a computing device 1000. In FIG. 10, the Computing apparatus 1000 includes a CPU 1001 which performs the processes described above. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the Computing apparatus 1000 communicates, such as a server or computer.

Further, the claimed advancements may be provided as a utility application, background daemon, or component of an operating system, or combination thereof, executing in conjunction with CPU 1001 and an operating system art.

CPU 1001 may be, e.g., a Xeon or Core processor from Intel of America, or may be other processor types that would be recognized by one of ordinary skill in the art. Alternatively, the CPU 1001 may be implemented on an FPGA, ASIC, PLD or using discrete logic circuits, as one of ordinary skill in the art would recognize. Further, CPU 1001 may be implemented as multiple processors cooperatively working in parallel to perform the instructions of the inventive processes described above.

The computing apparatus 1000 in FIG. 10 also includes a network controller 1006 for interfacing with network 1080. As can be appreciated, the network 1080 can be a public network, such as the Internet, or a private network such as an LAN or WAN network, or any combination thereof and can also include PSTN or ISDN sub-networks. The network 1080 can also be wired, such as an Ethernet network, or can be wireless such as a cellular network. The wireless network can also be WiFi, Bluetooth, or any other wireless form of communication.

The Computing apparatus 1000 further includes a display controller 1008 for interfacing with display 1010, such as a liquid crystal display (LCD) monitor or an organic light emitting diode (OLED) screen. A general purpose I/O interface 1012 interfaces with a keyboard and/or mouse 1014 as well as a touch screen panel 1016 on or separate from display 1010. General purpose I/O interface also connects to a variety of sensors 1016 and actuators 1018. For example, the sensors 1016 and actuators 1018 can be robotic mechanisms that performs Automated Fiber Placement (ATP), Tailored Fiber Placement (TFP), or continuous Fiber Printing (CFP).

A sound controller 1020 is also provided in the Computing apparatus 1000, such as Sound Blaster Z sound card from Creative, to interface with speakers/microphone 1022 thereby providing sounds and/or music.

The general purpose storage controller 1024 connects the storage medium disk 1004 with communication bus 1026, which may be a PCI express (PCI-e), Hypertransport (HT), ISA, EISA, VESA, PCI, ACG, or similar, for interconnecting all of the components of the Computing apparatus 1000. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Figure 11:
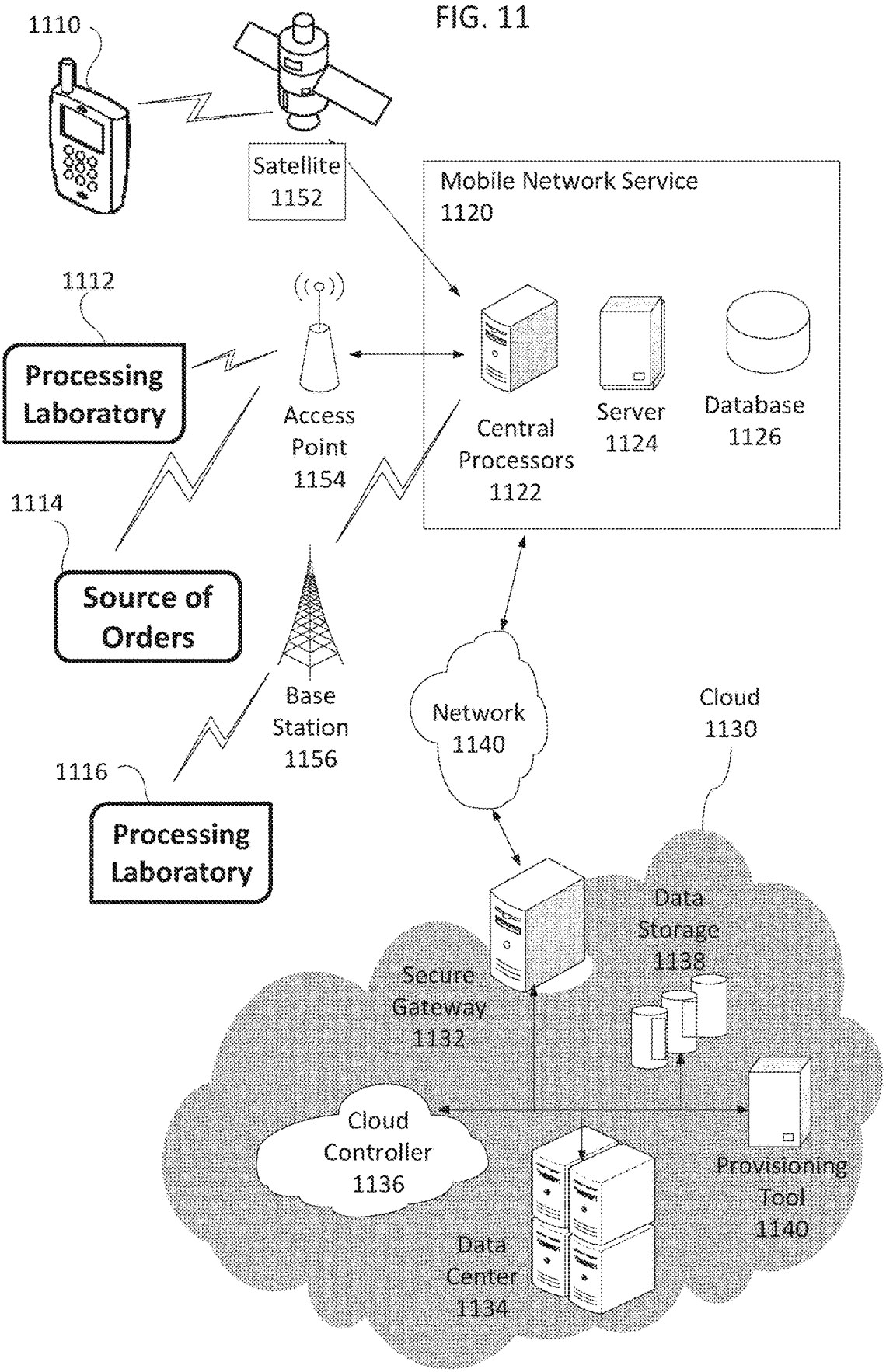
FIG. 11 shows an example of a cloud-computing system, according to one implementation.

Further, the various steps of methods 400 and 500, as described herein, can be executed using cloud computing, as shown in FIG. 11. For example, one or more processors can execute a cloud-based application performing the functions of steps of method 500 to train the DL network 8110. The one or more processors can be distributed across one or more cloud computing centers that communicate with a mobile communication device 1110 of a customer, a first OML 1112, a second OML 116, and an ECP 1114 using a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized processing locations and accessible to multiple users who interact with the centralized processing locations through individual terminals.

FIG. 11 shows an example of cloud computing. For example, a customer using a smart phone 1110, an ECP 1112, or an OML 1112 and 1116 can connect to a mobile network service 1120 through a wireless channel using a base station 1156, such as an Edge, 3G, 4G, or LTE Network. Additionally, the customer, ECP, or OML can connect to the mobile network service 1120 through a wireless access point 1154, such as a femto cell or Wi-Fi network. Further, the customer, ECP, or OML can connect to the mobile network service 1120 through a satellite connection 1152, for example. In certain implementations, the customer, ECP, or OML can also access a cloud 1130 through a fixed/wired connection, such as through a USB connection to a desktop or laptop computer or workstation that is connected to the network 1140 via a network controller, such as an Intel Ethernet PRO network interface card from Intel Corporation of America, for interfacing with a network. In certain implementations the customer, ECP, or OML can also access a cloud 1130 through short range communication such as a near-field communication terminal.

Signals from the wireless interfaces (e.g., the base station 1156, the wireless access point 1154, and the satellite connection 1152) are transmitted to the mobile network service 1120, such as an EnodeB and radio network controller, UMTS, or HSDPA/HSUPA. Requests from mobile users and their corresponding information are transmitted to central processors 1122 that are connected to servers 1124 providing mobile network services, for example. Further, mobile network operators can provide services to the mobile communication device 100. For example, these services can include authentication, authorization, and accounting based on home agent and subscribers' data stored in databases 1126, for example. The PIs, customer feedback, routing decisions, and routed orders can be delivered to the cloud 1130 through a network 1140.

As can be appreciated, the network 1140 can be a public network, such as the Internet, or a private network such as an LAN or WAN network, or any combination thereof and can also include PSTN or ISDN sub-networks. The network 1140 can also be a wired network, such as an Ethernet network, or can be a wireless network such as a cellular network including EDGE, 3G and 4G wireless cellular systems. The wireless network can also be Wi-Fi, Bluetooth, or any other wireless form of a communication that is known.

The mobile communication device 100 connects via the network 1140 to the cloud 1130, receives inputs from the cloud 1130, and transmits data to the cloud 1130. In the cloud 1130, a cloud controller 1136 can process a request to provide users with corresponding cloud services. These cloud services can be provided using concepts of utility computing, virtualization, and service-oriented architecture.

The cloud 1130 can be accessed via a user interface such as a secure gateway 1132. The secure gateway 1132 can, for example, provide security policy enforcement points placed between cloud service consumers and cloud service providers to interject enterprise security policies as the cloud-based resources are accessed. Further, the secure gateway 1132 can consolidate multiple types of a security policy enforcement, including, for example, authentication, single sign-on, authorization, security token mapping, encryption, tokenization, logging, alerting, and API control. The cloud 1130 can provide, to users, computational resources using a system of virtualization, wherein processing and memory requirements can be dynamically allocated and dispersed among a combination of processors and memories such that the provisioning of computational resources is hidden from the users and making the provisioning appear seamless as though performed on a single machine. Thus, a virtual machine is created that dynamically allocates resources and is therefore more efficient at utilizing available resources. A system of virtualization using virtual machines creates an appearance of using a single seamless computer even though multiple computational resources and memories can be utilized according increases or decreases in demand. The virtual machines can be achieved using a provisioning tool 1140 that prepares and equips the cloud-based resources such as a processing center 1134 and a data storage 1138 to provide services to the users of the cloud 1130. The processing center 1134 can be a computer cluster, a data center, a main frame computer, or a server farm. The processing center 1134 and data storage 1138 can also be collocated.

The steps of methods 400 and 500 can be distributed and variously/partly performed using data center 1134 and data storage 1138 as well as being partly performed using computational hardware at the OMLs and ECPs.

In view of the above disclosure the methods and apparatuses disclosed herein are enabled to perform a process having several advantages over previous processes for optical Rx order routing.

First, the process is able to capture, aggregate, and publish PI data from laboratories combined with a process to receive and store the PI data and use the PI data from various sources through an analytical process and rules engine (e.g., routing logic) to determine the optimal routing rule choice for a given order based on the preferences configured for that order and to effect the routing of the order based on the results of the analysis in an automated fashion. The PI data can be shared between two laboratories, or laboratories within a region or laboratories across the globe.

Second, the process is able to keep the PI values current within a given data set at a laboratory or group of laboratories and to remove old PI data that are no longer useful, and the process is able to analyze and aggregate the data in various ways that enhance the routing analysis process.

Third, the process is able to combine PI data and other data into a storage source or set of sources or to query data from a trusted source as needed and as data are available or published from various sources.

Fourth, the process is able to publish PI data or other data to laboratories or systems that can use the data for routing analysis and decision making.

Fifth, the process is able to build and store logic blocks that identify rule sets and priorities to be used by the analysis engine when evaluating the data sets of PI data to determine the optimal route for a given order.

Sixth, the process includes that current work-in-process counts within potential destination laboratories including minimums, maximums, optimum counts for given order types, aggregations of order types within specific or general processing stations at those destination laboratories. By virtue of this, the process allows effective decision making to prevent overloads at the destination laboratories that could compromise delivery times, cost, or other aspects of the process.

Seventh, the process includes that sharing or access to inventory levels of the various components that are needed to produce an order such as lens availability and/or frame availability in inventory at the given destination laboratory.

Eighth, the process continuously adapts its decisions based on the changing inflow or access to data that have come from or are available relative to the destination site including work in process counts, yield, costs, turn-around time and more.

Ninth, the process is able to create logic blocks that hold data and routing logic (rules) that can be carried along with the order to allow downstream laboratories to understand the requirements and/or preferences that were associated with the originating order at the time of its capture and perhaps enriched along the delivery chain. For example, a given ECP might demand that the order be processed only at a laboratory that maintains a minimum quality level and can complete the order within a given/predefined number of days. The routing process and analytical engine can use these pieces of information in its process to decide where the order should be processed and where it should not be processed.

Tenth, the process is able to update logic blocks for orders in process as new information becomes available from the patient, originating ECP, originating laboratory, or any other source that has access and authority to modify the logic within the logic block.

In summary, the disclosed embodiments include systems and methods to balance the workload of a mix of orders among two or more optical laboratories. For example, the methods provide sharing performance indicator (PI) data among the laboratories, and this in turn enables intelligent load balancing processes, which can be crucial when thousands of optical prescription (Rx) orders are routed among optical laboratories. In certain implementations, the disclosed embodiments describe a system wherein the servers at the processing centers can communicate such that an originating lab that has an order to route will know the average cost (e.g., the cost can an aggregate of factors such as time, money, quality, and other factors that can be measured as part of the PIs) to process that order in any individual laboratory across a network of laboratories. Further, the originating lab will also know the capacities and counts of work in process at specific and aggregate levels as well as quality, yield, and turn-around times for various product groupings from laboratory to laboratory. The disclosed embodiments also describe a logic block process that will capture and respect the intentions of the ordering entity with respect to its preferences and ranking of turn-around time vs cost vs quality and other actions. The concept of these shared data and logic blocks allows an analytical and artificial intelligence engine to be described in the embodiments such that a local, regional, or global collection of laboratories can effectively operate as one entity to share orders and balance the workload effectively, efficiently and to the betterment of the optical industry and the patients or consumers that will have placed the orders. Thus, the disclosed embodiments provide systems and methods for accumulating, aggregating, analyzing, interacting, and processing the data sets and algorithms that are used to assist in the order routing process among commercial entities, routing hubs, processing laboratories, and fulfillment centers.

The above disclosure also encompasses the embodiments listed below.

(1) A method of optical manufacturing, the method including: obtaining, from optical manufacturing laboratories (OMLs), a plurality of performance indictors (PIs), the PIs being obtained by one or more participants selected from an administrative team of the OMLs and an eye care practitioner (ECP) of one or more ECPs; generating, by processing circuitry of the one or more participants, logic blocks that express priorities for respective manufacturing orders; applying, by the processing circuitry, the logic blocks and the plurality of PIs as inputs to selection rules, the selection rules ranking the OMLs in accordance with the priorities for the respective manufacturing orders; and routing, by a communication interface of the one or more participants, the manufacturing orders to an optimal combination of the OMLs where the lenses are manufactured, the optimal combination of the OMLs being determined by the processing circuitry in accordance with the selection rules.

(2) The method of (1), wherein the step of applying the logic blocks and the plurality of PIs as inputs to the selection rules further includes that the selection rules include a utility function that evaluates the plurality of PIs of the respective OMLs in accordance with a logic block corresponding to a given manufacturing order to determine which of the OMLs best satisfies the priorities of the given manufacturing order as expressed by the logic block corresponding to the given manufacturing order.

(3) The method of (1) or (2), further including rerouting a manufacturing order from a first OML to a second OML, when manufacturing lenses of the manufacturing order at the second OML is determined to produce a more optimal value of the utility function than would be produced by manufacturing the lenses of the manufacturing order at the first OML.

(4) The method of any one of (1)-(3), further including: sending, to the optimal combination of the OMLs, the logic blocks together with the manufacturing orders, updating, at an OML, a logic block corresponding to a given manufacturing order, when the OML receives from the ECP a change to the given manufacturing order, and rerouting the given manufacturing order from the OML to another OML, when so doing would better satisfy the selection rules.

(5) The method of any one of (1)-(4), wherein the step of generating the logic blocks further includes that the logic blocks comprise elements including two or more elements selected from (i) a time to complete manufacturing, (ii) a manufacturing cost, (iii) a quality rating, (iv) surfacing manufacturing capabilities, (v) edging manufacturing capabilities, (vi) coating manufacturing capabilities, (vii) an inventory of availability of a component used in manufacturing the order, and (viii) shipping, and the step of publishing the plurality of PIs further includes that the PIs comprise two or more elements selected from (i) an overall process time, (ii) a production capacity, (iii) manufacturing capabilities, (iv) a cost, (v) inventories of availability of components, and (vi) quality indicators.

(6) The method of any one of (1)-(5), further including: receiving at the one or more ECPs another PI based on customer feedback and/or reviews of previous orders manufactured by the respective OMLs, monitoring the plurality of PIs and/or the another PI for changes, training a machine-learning method to predict values of the plurality of PIs and/or the another PI based on the monitored plurality of PIs and/or the another PI, and applying the another PI together with the logic blocks and the plurality of PIs as inputs to selection rules, thereby determining the optimal combination of the OMLs to route the manufacturing orders.

(7) The method of any one of (1)-(6), wherein the step of applying the logic blocks and the plurality of PIs as inputs to the selection rules further includes work-load balancing among the OMLs thereby avoiding a case in which one of the OMLs is overloaded with manufacturing orders.

(8) The method of any one of (1)-(7), wherein the step of publishing the plurality of PIs further includes that the plurality of PIs includes one or more elements selected from (i) work in process counts, (ii) a yield, (iii) costs, and (iv) a turn-around time.

(9) An eye care practitioner (ECP) apparatus for controlling optical manufacturing of lenses, the apparatus including: a communication interface configured to receive a plurality of performance indictors (PIs) published by optical manufacturing laboratories (OMLs), the respective plurality of PIs corresponding to each OML representing manufacturing capabilities and/or capacity of the each OML, and send manufacturing orders to selected OMLs; and processing circuitry configured to generate logic blocks that represent priorities for respective manufacturing orders of lenses, apply the logic blocks and the plurality of PIs as inputs to selection rules, the selection rules ranking the OMLs in accordance with the priorities for the respective manufacturing orders of lenses, and select, based on the selection rules, an optimal combination of the OMLs to manufacture the lenses, and control the communication interface to send the respective manufacturing orders to the optimal combination of the OMLs where the lenses are manufactured.

(10) The apparatus of (9), wherein the processing circuitry is further configured to apply the logic blocks and the plurality of PIs as inputs to the selection rules, wherein the selection rules include a utility function that evaluates the plurality of PIs of the respective OMLs in accordance with a logic block corresponding to a given manufacturing order to determine which of the OMLs best satisfies the priorities of the given manufacturing order as expressed by the logic block corresponding to the given manufacturing order.

(11) The apparatus of (9) or (10), wherein the processing circuitry is further configured to select an optimal combination of the OMLs based on optimizing a utility function that is based on the priorities of the logic blocks, wherein each of the logic blocks corresponds to a respective manufacturing order, and the each of the logic blocks represents relative priorities among two or more elements selected from (i) a time to complete manufacturing, (ii) a manufacturing cost, (iii) quality ratings of the OMLs, (iv) surfacing manufacturing capabilities of the OMLs, (v) edging manufacturing capabilities of the OMLs, (vi) coating manufacturing capabilities of the OMLs, (vii) surfacing manufacturing capabilities, (viii) an inventory of availability of an component used in manufacturing the order, (ix) manufacturing throughput/capacity of the OMLs, and (x) shipping considerations.

(12) The apparatus of any one of (9)-(11), wherein the processing circuitry is further configured to select an optimal combination of the OMLs based on optimizing a utility function that is based on the obtained plurality of PIs, wherein, for each OML of the OMLs, the obtained plurality of PIs comprises two or more elements selected from (i) an overall process time, (ii) a production capacity, (iii) manufacturing capabilities, (iv) a cost, (v) inventories of one or more components used in manufacturing the order, and (vi) quality indicators.

(13) The apparatus of any one of (9)-(12), wherein the processing circuitry is further configured to update a logic block corresponding to a given manufacturing order, when priorities for the given manufacturing orders change, and reroute the given manufacturing order from a first OML to a second OML, when so doing is determined to better satisfy the selection rules.

(14) The apparatus of any one of (9)-(13), wherein the processing circuitry is further configured to receive at the ECP another PI based on customer feedback or reviews of previous orders manufactured by the respective OMLs, the another PI being included with the plurality of PIs, monitor the plurality of PIs for changes, train a machine-learning method to predict values of the plurality of PIs based on the monitored plurality of PIs, and apply the logic blocks and the plurality of PIs, which includes the another PI, as inputs to the selection rules, thereby determining the optimal combination of the OMLs to route the manufacturing orders.

(15) A non-transitory program storage device, readable by a computer, tangibly embodying a program of instructions executable by the computer to perform a method. The method includes: obtaining, from optical manufacturing laboratories (OMLs), a plurality of performance indictors (PIs), the PIs being obtained by one or more participants selected from an administrative team of the OMLs and an eye care practitioner (ECP) of one or more ECPs; generating, by processing circuitry of the one or more participants, logic blocks that express priorities for respective manufacturing orders; applying, by the processing circuitry, the logic blocks and the plurality of PIs as inputs to the selection rules, the selection rules ranking the OMLs in accordance with the priorities for the respective manufacturing orders; and routing, by a communication interface of the one or more participants, the manufacturing orders to an optimal combination of the OMLs where the lenses are manufactured, the optimal combination of the OMLs being determined by the processing circuitry in accordance with the selection rule.

(16) The method of any one of (1)-(8), wherein the step of generating the logic blocks further includes that the inventory at an OML includes (i) a number of lens blanks available at the OML, (ii) a number of frames available at the OML, and/or (iii) a quantity of coating material available at the OML, the coating manufacturing capabilities includes one or more of (i) Crizal Prevencia anti-reflective coating capability, (ii) a Crizal Azure anti-reflective coating capability, (ii) TD2 Hard Coat, (ii) a scratch coat with polycarbonate material coating capability, (ii) a scratch coat with allyl diglycol carbonate, which is also called Cr-39 (Columbia Resin #39), coating capability.

(17) The method of any one of (1)-(8) and (16), wherein each of the manufacturing orders represents a respective prioritization of the plurality of PIs using a logic block, and based on a combination of the prioritization represented in the logic block together with the plurality of PIs the utility function determines to which of the OMLs the manufacturing order is sent.

(18) The method of any one of (1)-(8), (16), and (17), wherein the step of applying the logic blocks and the plurality of PIs as inputs to selection rules further includes that the logic blocks arranges a hierarchy of rules within the selection rules.

(19) The method of any one of (1)-(8) and (16)-(18), wherein the publishing the plurality of PIs is performed using a block chain, thereby ensuring security (reliability) of the obtained plurality of PIs.

(20) The method of any one of (1)-(8) and (16)-(19), wherein the step of applying the logic blocks and the plurality of PIs to the selection rules further includes that the priorities for the respective manufacturing orders are applied to weight the relative contributions in the utility function of respective PIs the plurality of PIs, and/or the priorities for the respective manufacturing orders are applied to arrange a hierarchy of the selection rule applied to determine an optimal OML for a given manufacturing order and corresponding logic block.

(21) The method of any one of (1)-(8) and (16)-(20), further including: sending a logic block with a manufacturing order that is being sent to a given OML, and evaluating, before fulfilling the manufacturing order, whether the plurality of PIs corresponding to the given OML have changed such that the given OML is no longer able to satisfy one or more requirements of the logic block, and, when the given OML is no longer able to satisfy the one or more requirements of the logic block, sending the manufacturing order to another OML that is able to satisfy all requirements of the logic block.

(22) A system of optical manufacturing, the system including: optical manufacturing laboratories (OMLs) that manufacture optical eye-care products and publish a plurality of performance indictors (PIs) representing manufacturing performance; and an eye care practitioner (ECP) receiving manufacturing orders from customers, and routing the manufacturing orders to the OMLS using processing circuitry configured to generate logic blocks that express priorities and requirements for respective manufacturing orders, apply the logic blocks to an objective (utility) function that ranks the OMLs based on the priorities for the respective manufacturing orders, and send the manufacturing orders to an optimal combination of the OMLs for which the objective (utility) function [decision rules] is optimized.

(23) The system of (22) performing the method of any one of (1)-(8) and (16)-(21).

(24) An optical manufacturing laboratories (OML) apparatus, the apparatus comprising: a communication interface configured to publish, to an eye care practitioner (ECP), a plurality of performance indictors (PIs), the respective plurality of PIs representing manufacturing capabilities of the OML and/or manufacturing capacity of the OML, and receive manufacturing orders from the eye care practitioner, the manufacturing orders being received together with respective logic blocks corresponding to the received manufacturing orders; and processing circuitry configured to generate logic blocks that represent priorities (preferences) and requirements for respective manufacturing orders, apply the logic blocks to an objective (utility) function that ranks the OMLs based on the priorities for the respective manufacturing orders, and select an optimal combination of the OMLs to which to send the respective manufacturing orders, the optimal combination of the OMLs being selected based on selection rules to satisfy the priorities and requirements of the logic blocks.

(25) The OML of (22) performing the method of any one of (1)-(8) and (16)-(21).

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A method of optical manufacturing of lenses, the method comprising:
obtaining, from optical manufacturing laboratories (OMLs), a plurality of performance indicators (PIS), the PIs being obtained by one or more participants selected from an administrative team of the OMLs and an eye care practitioner (ECP) of one or more ECPs, the PIs being one or more of an overall process time, process times for a given manufacturing step, an average turn-around time, a production capacity, manufacturing capabilities, inventories, and quality indicators;
generating, by processing circuitry of the one or more participants, logic blocks that express priorities for respective manufacturing orders, each of the logic blocks being a combination of a data structure and logic rules, the logic blocks comprising two or more elements selected from a time to complete manufacturing, a manufacturing cost, a quality rating, surfacing manufacturing capabilities, edging manufacturing capabilities, coating manufacturing capabilities, an inventory of availability of a component used in manufacturing the respective manufacturing order, and shipping;
applying, by the processing circuitry, the logic blocks and the plurality of PIs as inputs to selection rules, the selection rules ranking the OMLs in accordance with the priorities for the respective manufacturing orders of lenses; and
routing, by a communication interface of the one or more participants, the manufacturing orders to an optimal combination of the OMLs where the lenses are manufactured, the optimal combination of the OMLs being determined by the processing circuitry in accordance with the selection rules.

2. The method according to claim 1, wherein the selection rules include a utility function that evaluates the plurality of PIs of the respective OMLs in accordance with a logic block corresponding to a given manufacturing order to determine which of the OMLs best satisfies the priorities of the given manufacturing order as expressed by the logic block corresponding to the given manufacturing order.

3. The method according to claim 2, further comprising rerouting a manufacturing order from a first OML to a second OML, when manufacturing lenses of the manufacturing order at the second OML is determined to produce a more optimal value of the utility function than would be produced by manufacturing the lenses of the manufacturing order at the first OML.

4. The method according to claim 1, further comprising:
sending, to the optimal combination of the OMLs, the logic blocks together with the manufacturing orders >
updating, at an OML, a logic block corresponding to a given manufacturing order, when the OML receives from the ECP a change to the given manufacturing order; and
rerouting the given manufacturing order from the OML to another OML, when so doing would better satisfy the selection rules.

5. The method according to claim 1, further comprising:
receiving at the one or more ECPs another PI based on customer feedback or reviews of previous orders manufactured by the respective OMLs, the another PI being included with the plurality of PIs;
monitoring the plurality of PIs for changes;
training a machine-learning method to predict values of the plurality of PIs based on the monitored plurality of PIs and
applying the logic blocks and the plurality of PIs, which includes the another PI, as inputs to selection rules, thereby determining the optimal combination of the OMLs to route the manufacturing orders.

6. The method according to claim 1, wherein the applying the logic blocks and the plurality of PIs as inputs to the selection rules further includes work-load balancing among the OMLs thereby avoiding a case in which one of the OMLs is overloaded with manufacturing orders.

7. The method according to claim 1, wherein the plurality of PIS includes one or more elements selected from (i) work in process counts, (ii) a yield, (iii) costs, and (iv) a turn-around time.

8. The method according to claim 1, wherein the given manufacturing step is one of surfacing, coating, and edging.

9. An eye care practitioner (ECP) apparatus for controlling optical manufacturing of lenses, the apparatus comprising:
a communication interface configured to
receive a plurality of performance indicators (PIs) published by optical manufacturing laboratories (OMLs), respective PIs of the plurality of PIs corresponding to each of the OMLs and representing manufacturing capabilities or capacities of the corresponding OML, the PIs being one or more of an overall process time, process times for a given manufacturing step, an average turn-around time, a production capacity, manufacturing capabilities, inventories, and quality indicators, and send manufacturing orders to selected OMLs; and processing circuitry configured to generate logic blocks that represent priorities for respective manufacturing orders of lenses, each of the logic blocks being a combination of a data structure and logic rules, the logic blocks comprising two or more elements selected from a time to complete manufacturing, a manufacturing cost, a quality rating, surfacing manufacturing capabilities, edging manufacturing capabilities, coating manufacturing capabilities, an inventory of availability of a component used in manufacturing the respective manufacturing order, and shipping, apply the logic blocks and the plurality of PIs as inputs to selection rules, the selection rules ranking the OMLs in accordance with the priorities for the respective manufacturing orders of lenses, select, based on the selection rules, an optimal combination of the OMLs to manufacture the lenses, and control the communication interface to send the respective manufacturing orders to the optimal combination of the OMLs where the lenses are manufactured.

10. The apparatus according to claim 9, wherein the processing circuitry is further configured to apply the logic blocks and the plurality of PIs as inputs to the selection rules, wherein the selection rules include a utility function that evaluates the plurality of PIs of the respective OMLs in accordance with a logic block corresponding to a given manufacturing order to determine which of the OMLs best satisfies the priorities of the given manufacturing order as expressed by the logic block corresponding to the given manufacturing order.

11. The apparatus according to claim 9, wherein the processing circuitry is further configured to update a logic block corresponding to a given manufacturing order, when the priorities for the given manufacturing orders change, and reroute the given manufacturing order from a first OML to a second OML, when so doing is determined to better satisfy the selection rules.

12. The apparatus according to claim 9, wherein the processing circuitry is further configured to receive at the ECP another PI based on customer feedback or reviews of previous orders manufactured by the respective OMLs, the another PI being included with the plurality of PIS, monitor the plurality of PIs for changes, train a machine-learning method to predict values of the plurality of PIs based on the monitored plurality of PIs, and apply the logic blocks and the plurality of PIs, which includes the another PI, as inputs to the selection rules, thereby determining the optimal combination of the OMLs to route the manufacturing orders.

13. The apparatus according to claim 9, wherein the given manufacturing step is one of surfacing, coating, and edging.

14. A non-transitory program storage device, readable by a computer, tangibly embodying a program of instructions executable by the computer to perform a method comprising:

obtaining, from optical manufacturing laboratories (OMLs), a plurality of performance indicators (PIs), the PIs being obtained by one or more participants selected from an administrative team of the OMLs and an eye care practitioner (ECP) of one or more ECPs, the PIs being one or more of an overall process time, process times for a given manufacturing step, an average turnaround time, a production capacity, manufacturing capabilities, inventories, and quality indicators;

generating, by processing circuitry of the one or more participants, logic blocks that express priorities for respective manufacturing orders, of the logic blocks being a combination of a data structure and logic rules, the logic blocks comprising two or more elements selected from a time to complete manufacturing, a manufacturing cost, a quality rating, surfacing manufacturing capabilities, edging manufacturing capabilities, coating manufacturing capabilities, an inventory of availability of a component used in manufacturing the respective manufacturing order, and shipping;

applying, by the processing circuitry, the logic blocks and the plurality of PIs as inputs to the selection rules, the selection rules ranking the OMLs in accordance with the priorities for the respective manufacturing orders; and routing, by a communication interface of the one or more participants, the manufacturing orders to an optimal combination of the OMLs where the lenses are manufactured, the optimal combination of the OMLs being determined by the processing circuitry in accordance with the selection rules.

15. The non-transitory program storage device according to claim 14, wherein the given manufacturing step is one of surfacing, coating, and edging.

* * * * *